United States Patent
Sakai et al.

(10) Patent No.: US 6,759,475 B2
(45) Date of Patent: *Jul. 6, 2004

(54) RESIN COMPOSITION BASED ON CRYSTALLINE POLYPROPYLENE

(75) Inventors: Ikunori Sakai, Sakai (JP); Tohru Takaoka, Sakai (JP); Satoru Moriya, Saeki-Gun (JP); Mikio Hashimoto, Sakai (JP); Hideki Nakagawa, Sayama (JP); Hiroshi Yoshikawa, Takaishi (JP)

(73) Assignee: Mitsui Chemicals, Inc., Tokyo (JP)

( * ) Notice: Subject to any disclaimer, the term of this patent is extended or adjusted under 35 U.S.C. 154(b) by 383 days.

This patent is subject to a terminal disclaimer.

(21) Appl. No.: 09/881,677

(22) Filed: Jun. 18, 2001

(65) Prior Publication Data

US 2002/0058741 A1 May 16, 2002

Related U.S. Application Data

(63) Continuation of application No. 09/202,950, filed as application No. PCT/JP98/01890 on Apr. 24, 1998, now abandoned.

(30) Foreign Application Priority Data

Apr. 24, 1997 (JP) ............................................. 9-107866

(51) Int. Cl.$^7$ ............................ C08I 23/00; C08L 53/00
(52) U.S. Cl. ...................... 524/515; 524/525; 524/528; 525/88; 525/89; 525/240
(58) Field of Search ................................ 524/515, 525, 524/528; 526/88; 525/89, 240

(56) References Cited

U.S. PATENT DOCUMENTS

| | | | |
|---|---|---|---|
| 4,948,841 A | 8/1990 | Kasahara et al. | ........... 525/240 |
| 5,543,454 A | 8/1996 | Kamakura et al. | .......... 524/451 |
| 6,403,708 B2 * | 6/2002 | Moriya et al. | ................ 525/88 |

FOREIGN PATENT DOCUMENTS

| | | |
|---|---|---|
| EP | 0794225 | 9/1997 |
| JP | 62277461 | 12/1987 |
| JP | 1126354 | 5/1989 |
| JP | 6179785 | 6/1994 |
| JP | 6192504 | 7/1994 |
| JP | 6287365 | 10/1994 |
| JP | 7 53828 | 2/1995 |
| JP | 8169986 | 7/1996 |
| JP | 9 71693 | 3/1997 |
| JP | 9241445 | 9/1997 |

* cited by examiner

*Primary Examiner*—Peter D. Mulcahy
(74) *Attorney, Agent, or Firm*—Burns, Doane, Swecker & Mathis, LLP

(57) ABSTRACT

The present invention provides a resin composition based on crystalline polypropylene which includes: (a) 3–65% by weight of a component soluble in paraxylene of 23° C., (b) 35–97% by weight of a component soluble in paraxylene of 135° C. and insoluble in paraxylene of 23° C., and (c) 0–30% by weight of a compoent insoluble in paraxylene of 135° C. The component (a) soluble in paraxylene of 23° C. is composed substantially of an elastomeric constituent (a1) having a content of styrene or its derivative in the range of 0–35% by weight and an intrinsic viscosity (n) in the range of 0.1–5 dl/g, the component (b) soluble is paraxylene of 135° C. and insoluble in paraxylene of 23° C. is composed substantially of a crystalline polyproylene constituent (b1) having an isotactic pentad proportion (mmmm) of 97% or higher, a molecular weight distribution (Mw/Mn) of 6 or higher and a molecular weight distribution (Mz/Mw) of 6 or higher and the component (c) insoluble in paraxylene of 135° C. is composed substantially of a filler (c1).

28 Claims, No Drawings

RESIN COMPOSITION BASED ON CRYSTALLINE POLYPROPYLENE

This application is a continuation of Ser. No. 09/202,950, filed Dec. 23, 1998 now abandoned to which applicants claim priority. Applicants also claim priority to applicants' PCT/JP 98/01890, filed Apr. 24, 1998 and to the Japanese application No. 107866/1997, filed Apr. 24, 1997.

FIELD OF THE TECHNIQUE

The present invention relates to a resin composition based on crystalline polypropylene and specifically to such a resin composition based on crystalline polypropylene which is superior in the mechanical properties and in the flowability upon injection molding and can serve for a material for producing moldings exhibiting better appearance.

BACKGROUND OF THE TECHNIQUE

For domestic electrified articles and parts for automobile made of moldings of polypropylene resin composition, a superior external appearance in favor of providing a high grade and high designing impression is requested in addition to the requisite mechanical properties. Heretofore, there have been proposed many resin compositions based on polypropylene, in which elastomers, talc, pigments and so on, are blended together with crystalline propylene block-copolymer, in order to improve the mechanical properties thereof. For example, Japanese Patent Application Kokais Sho-58-168649 A and Hei-3-172339 A (corresponding to U.S. Pat. No. 5,086,109) disclose polypropylene resin compositions, in which the balance between the rigidity and the shock resistance is improved by blending elastomers, talc, pigments and so on together with crystalline propylene block-copolymers.

When, however, such a polypropylene resin composition as above is molded by injection molding, a considerable deterioration in the appearance of the molded products may, in some cases, occur due to occurrence of "flow marks", namely, stripes caused by repetition of high- and low-gloss regions on the surface of the molding.

In solving such a problem, Japanese Patent Application Kokais Hei-7-53828 A (corresponding to U.S. Pat. No. 5,543,454) and Hei-9-71712 A disclose each a polypropylene resin composition comprising a crystalline propylene block-copolymer which comprises a homo-polypropylene component (homo-component) having a low molecular weight and a component soluble in paraxylene of 23° C. (rubber component) having a high molecular weight. These polypropylene resin compositions do not suffer from occurrence of the flow mark and are superior in the flowability upon injection molding.

However, the above-mentioned polypropylene resin compositions may occasionally suffer from deterioration in appearance of molded product therefrom due to formation of "rashes" on the surface of the injection-molded product brought about by the formation of "polymer gel", namely, a difficultly soluble aggregate formed from a part of the rubber component by being caused to become high molecular weight, in addition to an occasionally accompanying decrease in the impact resistance. Moreover, production of a crystalline propylene block-copolymer, in which the molecular weight of the homo-component is caused to become low molecular weight and that of the rubber-component is caused to become high molecular weight, is attained only in a low productivity at a high production cost. Thus, also for the polypropylene resin composition constituted of crystalline propylene block-copolymers in which the molecular weight of the homo-component is caused to become low molecular weight and that of the rubber-component is caused to become high molecular weight, the mechanical properties and the appearance of the molded product are not sufficiently improved and a high production cost is required.

The subject of the present invention is to provide a resin composition based on crystalline polypropylene which can bring about molded products without suffering from occurrence of flow-mark and rashes caused from formation of polymer gel and, therefore, exhibiting a superior appearance with excellent mechanical strengths, such as flexural modulus and so on, together with better flowability upon the molding and which can be obtained at a low cost by selecting starting raw materials of high productivity.

DISCLOSURE OF THE INVENTION

The present invention relates to a resin composition based on crystalline polypropylene which is to be defined as follows:

(1) A resin composition based on crystalline polypropylene, comprising
  (a) 3–65% by weight of a component soluble in paraxylene of 23° C.,
  (b) 35–97% by weight of a component soluble in paraxylene of 135° C. and insoluble in paraxylene of 23° C. and
  (c) 0–30% by weight of a component insoluble in paraxylene of 135° C.,
wherein
  the component (a) soluble in paraxylene of 23° C. is composed substantially of an elastomeric constituent (a1) having a content of styrene or its derivative in the range of 0–35% by weight and an intrinsic viscosity $[\eta]$ determined in decalin at 135° C. in the range of 0.1–5 dl/g,
  the component (b) soluble in paraxylene of 135° C. and insoluble in paraxylene of 23° C. is composed substantially of a crystalline polypropylene constituent (b1) having an isotactic pentad proportion (mmmm) of 97% or higher, a molecular weight distribution expressed by weight-average molecular weight/number-average molecular weight (Mw/Mn), determined by gel permeation chromatography (GPC), of 6 or higher and a molecular weight distribution expressed by z-average molecular weight/weight-average molecular weight (Mz/Mw) of 6 or higher and
  the component (c) insoluble in paraxylene of 135° C. is composed substantially of a filler (c1).

(2) A resin composition based on crystalline polypropylene, comprising
  (a) 20–35% by weight of a component soluble in paraxylene of 23° C.,
  (b) 43–65% by weight of a component soluble in paraxylene of 135° C. and insoluble in paraxylene of 23° C. and
  (c) 15–22% by weight of a component insoluble in paraxylene of 135° C.,
wherein
  the component (a) soluble in paraxylene of 23° C. is composed substantially of an elastomeric constituent (a1) having a content of styrene or its derivative in the range of 0–35% by weight and an intrinsic viscosity $[\eta]$ determined in decalin at 135° C. in the range of 0.1–5 dl/g, the component (b) soluble in paraxylene of 135° C. and insoluble in paraxylene of 23° C. is composed substantially of a crystalline polypropylene constituent (b1) having an isotactic pentad proportion (mmmm) of 98% or higher, a molecular weight distribution expressed by weight-average molecular weight/number-average molecular weight (Mw/Mn), determined by gel permeation chromatography (GPC), of 9 or higher and a molecular weight distribution expressed by z-average molecular weight/weight-average molecular weight (Mz/Mw) of 8 or higher and the component (c) insoluble in paraxylene of 135° C. is composed substantially of powdery talc having an average particle size in the range of 1–5 μm.

(3) A resin composition based on crystalline polypropylene as defined in above (1) or (2), wherein the elastomeric constituent (a1) comprises at least one elastomeric constituent selected from the group consisting of
  (A-1) an elastomeric constituent, which may or may not be hydrogenated, based on styrene having a styrene content in the range of 10–70% by weight and a conjugated diene content in the range of 30–90% by weight;
  (A-2) an ethylene/α-olefin random copolymer constituent; and
  (A-3) an ethylene/α-olefin/non-conjugated polyene random copolymer constituent.

(4) A resin composition based on crystalline polypropylene as defined in above (1) or (2), wherein the elastomeric constituent (a1) comprises at least one elastomer selected from the group consisting of
  (A-1) an elastomeric constituent, which may or may not be hydrogenated, based on styrene having 10–40% by weight of a constituent polymer block based on styrene and 60–90% by weight of a constituent polymer block based on a conjugated diene;
  (A-2) an ethylene/α-olefin random copolymer constituent; and
  (A-3) an ethylene/α-olefin/non-conjugated polyene random copolymer constituent.

(5) A resin composition based on crystalline polypropylene as defined in above (1) or (2), wherein the elastomeric constituent (a1) comprises at least one elastomeric constituent selected from the group consisting of
  (A-1) an elastomeric constituent, which may or may not be hydrogenated, based on styrene having 10–70% by weight of a constituent polymer block based on styrene and 30–90% by weight of a constituent polymer block based on a conjugated diene;
  (A-2) an ethylene/α-olefin random copolymer constituent;
  (A-3) an ethylene/α-olefin/non-conjugated polyene random copolymer constituent; and
  (Da) propylene/ethylene copolymer part in a crystalline block-copolymer component based on propylene (D).

(6) A resin composition based on crystalline polypropylene as defined in any one of above (1) to (5), wherein the crystalline polypropylene constituent (b1) comprises at least one crystalline polypropylene constituents selected from the group consisting of
  (B-1) a crystalline polypropylene constituent which comprises a high molecular weight polypropylene product having an intrinsic viscosity [η], determined in decalin at 135° C., of 4–13 dl/g in an amount in the range of 1–35% by weight and which has a melt flow rate (MFR) of the entire polypropylene constituent, determined at 230° C. under a load of 2160 g, in the range of 1–100 g/10 min., a propylene content in the range of 95–100 mole % and an ethylene content in the range of 0–5 mole %;
  (B-2) a crystalline polypropylene constituent other than that of the above (B-1); and
  (Db) propylene homopolymer part in the propylene-based crystalline block-copolymer component (D).

(7) A resin composition based on crystalline polypropylene as defined in any one of above (1) to (6), wherein the crystalline polypropylene constituent (b1) is composed substantially of a crystalline polypropylene product which comprises a constituent component having a weight-average molecular weight (Mw) for the 121° C. elution fraction, determined by cross fractionation chromatograph (CFC), of $3.5 \times 10^5$ or higher.

(8) A resin composition based on crystalline polypropylene as defined in any one of above (1) to (6), wherein the crystalline polypropylene constituent (b1) is composed substantially of a crystalline polypropylene product which comprises a constituent component having a weight-average molecular weight (Mw) for the 121° C. elution fraction, determined by cross fractionation chromatograph (CFC), of $3.5 \times 10^5$ or higher and an ethylene content in the highest molecular weight fraction (mM), determined by gel permeation chromatography (GPC), of 45% by weight or lower.

(9) A resin composition based on crystalline polypropylene as defined in any one of above (1) to (8), wherein the crystalline polypropylene constituent (b1) is composed substantially of a crystalline polypropylene product which has a melt flow rate (MFR), determined at 230° C. under a load of 2160 g, in the range of 5–400 g/10 min.

(10) A resin composition based on crystalline polypropylene as defined in any one of above (1) to (8), wherein the crystalline polypropylene constituent (b1) is composed substantially of a crystalline polypropylene product which has a melt flow rate (MFR), determined at 230° C. under a load of 2160 g, in the range of 30–150 g/10 min.

(11) A resin composition based on crystalline polypropylene as defined in any one of above (1) to (10), which comprises
  (A) at least one elastomeric component selected from the group consisting of
    (A-1) styrene-based elastomeric constituent, which may or may not be hydrogenated, having a styrene content in the range of 10–70% by weight and a conjugated diene content in the range of 30–90% by weight;
    (A-2) an ethylene/α-olefin random copolymer constituent; and
    (A-3) an ethylene/α-olefin/non-conjugated polyene random copolymer constituent;
  (B) at least one crystalline polypropylene constituent selected from the group consisting of
    (B-1) a crystalline polypropylene constituent which comprises a high molecular weight polypropylene product having an intrinsic viscosity [η], determined in decalin at 135° C., of 4–13 dl/g in an amount in the range of 1–35% by weight and which has a melt flow rate (MFR) of the entire polypropylene constituent, determined at 230° C. under a load of 2160 g, in the range of 1–100 g/10 min., a propylene content in the range of 95–100 mole % and an ethylene content in the range of 0–5 mole % and
    (B-2) a crystalline polypropylene constituent other than the above (B-1);

(C) a filler component; and
(D) a crystalline block-copolymer component based on propylene comprising
   (Da) a propylene/ethylene copolymer part and
   (Db) a propylene homopolymer part and containing, with respect to the total weight of the copolymer component, 5–50% by weight of the 23° C. paraxylene-soluble component (a) which has an intrinsic viscosity [η], determined in decalin at 135° C., of 2–10 dl/g and an ethylene content of 15–60 mole %,
   wherein the propylene/ethylene copolymer part (Da) is substantially the 23° C. paraxylene soluble component (a) and
      the propylene homopolymer part (Db) is substantially the component (b) soluble in 135° C. paraxylene and insoluble in 23° C. paraxylene and having a melt flow rate (MFR) determined at 230° C. under a load of 2160 g of 10–500 g/10 min. and
   wherein the weight ratio of (A)/(B)/(C)/(D) is in the range of (3–99)/(1–97)/(0–30)/(0–96).
(12) A resin composition based on crystalline polypropylene as defined in above (11), wherein the weight ratio of (A)/(B)/(C)/(D) is in the range of (3–40)/(1–50)/(0–30)/(10–96).
(13) A resin composition based on crystalline polypropylene as defined in above (11) or (12), wherein the crystalline polypropylene component (B) has an isotactic pentad proportion (mmmm) of 97% or higher.
(14) A resin composition based on crystalline polypropylene as defined in any one of above (11) to (13), wherein the crystalline polypropylene component (B) has a molecular weight distribution expressed by weight-average molecular weight/number-average molecular weight (Mw/Mn) determined by gel permeation chromatography (GPC) of 6 or higher and a molecular weight distribution expressed by z-average molecular weight/weight-average molecular weight (Mz/Mw) of 6 or higher.

The components (a)–(c) according to the present invention are those which are fractionally separated by a fractionation technique using paraxylene as follows:

5 grams of a sample of the resin composition based on crystalline polypropylene are added to 500 ml of paraxylene at 135° C. and the mixture is agitated sufficiently so as to cause complete dissolution of the soluble ingredient (soluble polymers) in the sample. The mixture is then cooled to 23° C. and is stood still for 24 hours. This mixture is then subjected to a centrifugation and the separated liquid phase is decanted off into 1,000 ml of acetone to cause deposition of the polymer. The resulting precipitate is filtered off and washed and dried to obtain the component (a) soluble in paraxylene at 23° C. The centrifugally separated solid phase is subjected to an extraction on a Soxhlet extractor furnished with a cylindrical filter paper using 300 ml of paraxylene at 135° C. for 6 hours, in order to separate it into a soluble fraction and an insoluble fraction. The soluble fraction-containing liquid phase is decanted off into 600 ml of acetone to cause deposition of the polymer. This precipitate is filtered off, followed by washing and drying, to obtain the component (b) soluble in paraxylene of 135° C. and insoluble in paraxylene of 23° C. The rest of the insoluble matter left after the Soxhlet extraction is washed and dried to obtain the component (c) insoluble in paraxylene at 135° C.

The component (a) soluble in paraxylene of 23° C. according to the present invention is composed substantially of an elastomeric constituent (a1) having a content of styrene or its derivative (designated hereinafter sometimes simply as the styrene content) in the range of 0–35% by weight, preferably 0–30% by weight, and an intrinsic viscosity [η] determined in decalin at 135° C. in the range of 0.1–5 dl/g, preferably 0.3–3 dl/g. Thus, the component (a) is composed substantially of the elastomeric constituent (a1) and preferably constituted entirely of the elastomeric constituent (a1), while it is permissible that a small amount, for example, not higher than 10% by weight, preferably not higher than 5% by weight, of other constituents, such as an atactic polypropylene having low crystallinity and so on, may be contained.

The elastomeric constituent (a1) may be composed of one single elastomer, a mixture of two or more elasomers or a mixture of one or more elastomers with minor proportion of other ingredient(s). In case it is a mixture, the styrene content and the intrinsic viscosity [η] mentioned above should refer to the average value for the constituent ingredients of the mixture, wherein it is permissible that an elastomer having a styrene content and/or an intrinsic viscosity [η] out of the above identified range may be included.

Concrete examples of the elastomer constituent (a1) include elastomers based on styrene (A-1) having a content of styrene in the range of 10–70% by weight, preferably 10–65% by weight, more preferably 10–40% by weight, and a content of a conjugated diene of 30–90% by weight, preferably 35–90% by weight, more preferably 60–90% by weight, and hydrogenation products of such elastomers; random copolymers of ethylene/α-olefin (A-2); random copolymers of ethylene/α-olefin/non-conjugated polyene (A-3); propylene/ethylene copolymer part (Da) in crystalline propylene block-copolymers (D); other elastomeric polymers; and mixtures of them.

Below, the constituent elastomers (A-1) to (A-3) are described, while the crystalline propylene block-copolymers (D) and the propylene/ethylene copolymer part (Da) will be described afterwards.

As the styrene-based elastomers and the hydrogenation products thereof (A-1), there may be exemplified block-copolymers based on styrene composed of a constituent polymer block based on styrene (denoted hereinafter sometimes as the styrenic block) and a constituent polymer block based on conjugated diene (denoted hereinafter sometimes as the dienic block); styrene/butadiene random copolymers; styrene/isoprene random copolymers; and styrene/chloroprene random copolymers as well as the hydrogenation products of them. Among them, preference is given to block-copolymers based on styrene.

The styrene-based constituent polymer block constituting the styrene-based block-copolymers is constituted of styrene or a derivative thereof, wherein the concrete monomer thereof includes, for example, styrene, α-methyl styrene, p-methyl styrene, chloro-styrene and vinylnaphthalene. Among them, preference is given to styrene. These monomers may be used either alone or in combination of two or more of them.

Concrete examples of the monomers constituting the polymer block based on conjugated diene include butadiene, isoprene and chloroprene. Among them, butadiene and isoprene are preferred. These monomers may be used either alone or in combination of two or more of them.

There is no special limitation for the form of binding between the styrenic block and the dienic block in the block-copolymers based on styrene, while a binding form of styrenic block-dienic block or of styrenic block-(dienic block-styrenic block)$_n$, in which n stands for a number of 1–5, is preferred.

The content of the constituent styrenic block in the styrene-based block-copolymer may favorably be in the range of 10–70% by weight, preferably 10–65% by weight, more preferably 10–40% by weight, and that of the conjugated dienic block may favorably be in the range of 30–90% by weight, preferably 35–90% by weight, more preferably 60–90% by weight.

The styrene-based block-copolymer can be produced by, for example, carrying out a block-copolymerization of starting comonomers in an inert reaction solvent in the presence of a lithium catalyst or a Ziegler catalyst. Detailed description of the production procedures is given in, for example, Japanese Patent Publication Sho-40-—23798 B.

As the styrene-based block-copolymer, those of the hydrogenation products are preferred, while those which are not subjected to hydrogenation may also be employed. On the hydrogenation, the double bonds in the dienic block are hydrogenated, wherein the yield of hydrogenation may favorably amount to 90 mole % or more, preferably 97 mole % or more, of the total dienic blocks. The hydrogenation treatment can be effected in an inert reaction solvent in the presence of a known hydrogenation catalyst. Concrete procedures are described in, for example, Japanese Patent Publications Sho-42-8704 B, Sho-43-6636 B and Sho-46-20814 B.

The block-copolymers based on styrene may favorably have a melt flow rate (MFR), determined at 230° C. under a load of 2160 g, of 0.1 g/10 min. or higher, preferably 0.3–20 g/10 min.

Concrete examples of the block-copolymers based on styrene include styrene/ethylene/butylene/styrene block-copolymer (SEBS), styrene/ethylene/propylene/styrene block-copolymer (SEPS), styrene/butadiene/styrene block-copolymer (SBS), styrene/isoprene/styrene block-copolymer (SIS) and styrene/ethylene/propylene block-copolymer (SEP).

For the styrene-based block-copolymer, commercial products can be employed. Concrete examples of commercial styrene-based block-copolymer products include SEPTON (trademark, a product of Kuraray Co., Ltd.), KRATON G (trademark, a product of Shell Kagaku K.K.) and TUFTEC (trademark, a product of Asahi Chemical Ind. Co., Ltd.).

When an elastomer based on styrene or its hydrogenation product having high styrene content is employed as the styrene-based elastomer (A-1) and the styrene content in the constituent (a1) exceeds over the value of 35% by weight by the sole use of such styrene-based elastomer, other constituent styrene-based elastomer(s) having lower styrene content, further ingredient(s) of ethylene/α-olefin random copolymer (A-2), ethylene/α-olefin/non-conjugated polyene random copolymer (A-3) or crystalline propylene block-copolymer (D) may be employed in combination with the styrene-based elastomer (A-1) so as to attain a content of styrene-structural unit in the constituent (1a) as an average value within the above-identified range.

The ethylene/α-olefin random copolymer (A-2) is a random copolymer rubber made of ethylene and an α-olefin having 3–20 carbon atoms. As the α-olefin having 3–20 carbon atoms to be co-polymerized with ethylene, there may be exemplified concretely propylene, 1-butene, 1-pentene, 1-hexene, 4-methyl-1-pentene, 1-heptene, 1-octene, 1-decene, 1-dodecene, 1-tetradecene, 1-hexadecene and 1-eicosene. These α-olefins may be used either solely or in combination of two or more of them. Among them, preference is given especially to propylene, 1-butene, 1-hexene and 1-octene.

The ethylene/α-olefin random copolymer (A-2) may favorably have an ethylene/α-olefin mole ratio in the range of 95/5–60/40, preferably 90/10–70/30. In the copolymer, styrene or its derivative may be contained in small amount under copolymerization, but preferably without being co-polymerized. The ethylene/α-olefin random copolymer (A-2) may favorably have an MFR at 230° C. under a load of 2160 g of 0.1 g/10 min. or higher, preferably 0.5–5 g/10 min.

The ethylene/α-olefin/non-conjugated polyene random copolymer (A-3) is a rundom copolymer rubber made of ethylene, an α-olefin having 3–20 carbon atoms and a non-conjugated polyene. As the α-olefin having 3–20 carbon atoms, the same monomers as above are enumerated.

As the non-conjugated polyene, there may be exemplified acyclic dienes, such as 5-ethylidene-2-norbornene, 5-propylidene-5-norbornene, dicyclopentadiene, 5-vinyl-2-norbornene, 5-methylene-2-norbornene, 5-isopropylidene-2-norbornene and norbornadiene; chain-formed non-conjugated dienes, such as 1,4-hexadiene, 4-methyl-1,4-hexadiene, 5-methyl-1,4-hexadiene, 5-methyl-1,5-heptadiene, 6-methyl-1,5-heptadiene, 6-methyl-1,7-octadiene and 7-methyl-1,6-octadiene; and trienes, such as 2,3-diisopropylidene-5-norbornene. Among them, 1,4-hexadiene, dicyclopentadiene and 5-ethylidene-2-norbornene are used favorably.

The ethylene/α-olefin/non-conjugated polyene random copolymer (A-3) may favorably have a mole ratio of ethylene/α-olefin/non-conjugated polyene in the range of 90/5/5–30/45/25, preferably 80/10/10–40/40/20. It is permissible that small proportion of styrene or a derivative thereof may be included under copolymerization, but preferably not be co-polymerized. The ethylene/α-olefin/non-conjugated polyene random copolymer (A-3) may favorably have an MFR at 230° C. and 2160 g load of 0.05 g/10 min. or higher, preferably 0.1–10 g/10 min. Concrete examples of the ethylene/α-olefin/non-conjugated polyene random copolymer (A-3) include ethylene/propylene/diene ternary copolymers (EPDM) and so on.

In the resin composition based on crystalline polypropylene according to the present invention, the component (b) soluble in paraxylene of 135° C. and insoluble in paraxylene of 23° C. is costituted substantially of a crystalline polypropylene constituent (b1) having an isotactic pentad proportion (mmmm) of 97% or more, preferably 97.5% or more, more preferably 98% or more, a molecular weight distribution in terms of weight-average molecular weight/number-average molecular weight (Mw/Mn), determined by gel permeation chromatography (GPC), of 6 or higher, preferably 9 or higher, more preferably 11 or higher, and a molecular weight distribution expressed by z-average molecular weight/weight-average molecular weight (Mz/Mw) of 6 or higher, preferably 8 or higher, more preferably 9 or higher. The component (b) is constituted substantially of a crystalline polypropylene constituent (b1) and preferably entirely of crystalline polypropylene constituent (b1), wherein it is permissible that other ingredient(s) may be contained in a small proportion, for example, 10% by weight or less, preferably 5% by weight or less.

The isotactic pentad proportion (mmmm) refers to a proportion of isotactic chains in terms of pentad units in the molecular chain of the crystalline polypropylene (b1) determined by $^{13}C$ NMR, namely, the proportion of number of propylene monomer units present each in the center of a chain of 5 successive propylene monomer units bound with each other by a meso-linkage relative to the total monomer units. Concretely, it is determined by the percent fraction of the mmmm peak relative to the total absorption peaks in the methyl carbon region in a $^{13}$C NMR spectrum.

If the values of Mw/Mn and Mz/Mw are in the above-identified ranges, a small amount, for example, 0.5–20% by weight, of polypropylene of an ultra high molecular weight of, for example, $1\times10^6$–$1\times10^7$, may be contained therein.

The crystalline polypropylene constituent (b1) may composed of a crystalline polypropylene of single species or of a mixture of two or more species of crystalline polypropylene or, further, a mixture of at least one crystalline polypropylene with small proportion of other ingredient(s). In the case of mixture, the isotactic pentad proportion (mmmm), Mw/Mn and Mz/Mw refer each to the average value with respect to the mixture and it is permissible that polypropylene(s) having isotactic pentad proportion (mmmm), Mw/Mn and/or Mz/Mw out of the above-identified range and/or other resin(s) may be included.

The crystalline polypropylene constituent (b1) may composed of a homopolymer of propylene or a copolymer with a small proportion, for example, 5 mole % or less, of other α-olefin(s) or so on. Concretely, it may contain, for example, 0–5 mole %, preferably 0–3 mole % of ethylene.

The crystalline polypropylene constituent (b1) may favorably composed substantially of a crystalline polypropylene product with constituent fractions including a 121° C.-elution fraction having a weight-average molecular weight (Mw) of $3.5\times10^5$ or higher, determined by a cross fractionation chromatography, and preferably including a 121° C.-elution fraction having a weight-average molecular weight (Mw) of $3.5\times10^5$ or higher and a 124° C.-elution fraction having a weight-average molecular weight (Mw) of $8\times10^5$ or higher. The content of the 121° C.-elution fraction having a weight-average molecular weight (Mw) of $3.5\times10^5$ or higher may favorably amount to 0.5% by weight or higher, preferably 1% by weight or higher. The content of the 124° C.-elution fraction having a weight-average molecular weight (Mw) of $8\times10^5$ or higher may favorably amount to 0.3% by weight or higher, preferably 0.5% by weight or higher.

The apparatus for the cross-fractionation chromatography (CFC) is composed of a unit for temperature rising elution fractionation (TREF) for effecting compositional fractionation and a unit for gel permeation chromatography (GPC) for effecting a molecular weight fractionation. Analysis by the CFC is performed in the manner as follows:

First, the polymer dissolved completely in ortho-dichlorobenzene (ODCB) at 135° C. is cooled, whereby a thin layer of the polymer is formed on a carrier of an inert material charged in the TREF column. The ODCB solution is passed to the TREF column at a first set temperature and the resulting first fraction eluted from the TREF column is introduced directly into the GPC unit to effect determination of the molecular weight of the first fraction. During this period, the temperature in the TREF column is elevated to a second set temperature and next elution is performed. After the molecular weight determination for the first fraction is over, the second fraction is introduced into the GPC unit. By repeating the above procedures successively, detailed informations for the molecular weight for each fraction over the entire distribution of composition are obtained. The set temperatures in the TREF column can voluntarily be settled at an interval of 3–5° C. within a temperature range of 0–135° C. Usually, the operation of the apparatus is carried out at set temperatures as given in Examples appearing afterwards. The molecular weight determined for the fraction eluted at 121° C. is designated as "molecular weight of 121° C.-elution fraction".

The crystalline polypropylene constituent (b1) may favorably composed substantially of a crystalline polypropylene product which comprises a 121° C.-elution fraction having a weight-average molecular weight (Mw), determined by cross fractionation chromatography (CFC), of $3.5\times10^5$ or higher and in which the maximum molecular weight fraction (mM), determined by gel permeation chromatography (GPC), has an ethylene content of 45% by weight or less, preferably 30% by weight or less, more preferably 20% by weight or less. The content of the 121° C.-elution fraction having a weight-average molecular weight (Mw) of $3.5\times10^5$ or higher may favorably be 0.5% by weight or more, preferably 1% by weight or more.

The maximum molecular weight fraction (mM) is defined as a fraction on the GPC elution curve in the interval of 1 weight % from the highest molecular weight side. The ethylene content in this fraction ($C_2$-mM) can be determined using a GPC-FTIR arrangement constituted of a GPC unit combined with an infrared absorption spectrophotometer (FTIR) having a detection part with glass cell for the solution. Thus, the molecular weight is determined in the GPC unit, while the ethylene content in each fraction eluted from the GPC column is observed on line continuously, whereby a GPC elution curve is obtained, on which the average ethylene content for the fraction in the interval of 1 wt. % from the highest molecular weight side can be determined. The ethylene content is determined in such a manner that the ratio of the absorbance for the methyl group at 2955 cm$^{-1}$ to the absorbance for the methylene group at 2928 cm$^{-1}$ is first detected on a spectrophotometer and this is then converted into the ethylene content by calibrating on a calibration curve prepared preliminarily using mixtures of polypropylene and polyethylene having known ethylene contents. Similar results may also be obtained by other method than the above GPC on-line method, such as by fractionally separating the fraction of 1 wt. % interval from the maximum molecular weight side of GPC and observing this in off-line for the IR absorption spectrum.

The crystalline polypropylene constituent (b1) may favorably have a melt flow rate (MFR), determined at 230° C. under a load of 2160 g, of 5–400 g/10 min., preferably 20–300 g/10 min., more preferably 30–150 g/10 min.

As concrete examples of the crystalline polypropylene constituent (b1), there may be enumerated a crystalline polypropylene (B-1) which contains 1–35% by weight, preferably 3–30% by weight of a high molecular weight polypropylene having an intrinsic viscosity [η] of 4–13 dl/g, preferably 5–10 dl/g, determined in decalin at 135° C., and which has a melt flow rate (MFR), with respect to the entire polypropylene, of 1–100 g/10 min., preferably 10–80 g/10 min., determined at 230° C. under a load of 2160 g, a propylene content of 95–100 mole %, preferably 97–100 mole %, and an ethylene content of 0–5 mole %, preferably 0–3 mole %; other crystalline polypropylene (B-2); and homo-polypropylene parts (Db) of a crystalline propylene block-copolymer (D); as well as mixtures of them. The crystalline polypropylenes (B-1) and (B-2) are described in the following and the crystalline propylene block-copolymer (D) and the homo-polypropylene parts (Db) will be described later on.

The crystalline polypropylene (B-1) may comprise other structural unit(s) derived from other comonomer(s) than propylene and ethylene. Such other comonomer may include, for example, α-olefins other than propylene, such as ethylene, 1-butene, 1-pentene, 1-hexene, 4-methyl-1-pentene, 3-methyl-1-penetene, 1-heptene, 1-octene, 1-nonene, 1-decene and 1-dodecene; vinyl compounds, such as styrene, vinylcyclopentene, vinylcyclohexane and vinylnorbornane; vinyl esters, such as vinyl acetate and the like; unsaturated organic acids and derivatives thereof, such as maleic anhydride and the like; conjugated diene compounds; non-conjugated polyenes, such as dicyclopentadiene, 1,4-hexadiene, dicyclooctadiene, methylenenorbornene and 5-ethylidene-2-norbonene. Among them, preference is given to ethylene and α-olefins having 4–10 carbon atoms. They may be present as copolymers of two or more of them.

The crystalline polypropylene (B-1) may favorably contain, as a prepolymer, 0.1% by weight or less, preferably 0.05% by weight or less, of a homopolymer or a copolymer of branched olefins, for example, 3-methyl-1-butene, 3,3-dimethyl-1-butene, 3-methyl-1-pentene, 3-ethyl-1-pentene, 4-methyl-1-pentene, 3-methyl-1-hexene, 4-methyl-1-hexene, 4,4-dimethyl-1-hexene, 4,4-dimethyl-1-pentene, 4-ethyl-1-hexene, 3-ethyl-1-hexene, 3,5,5-trimethyl-1-hexene, vinylcyclopentane, vinylcyclohexane, vinylcycloheptane, vinylnorbornane, allylnorbornane, styrene, dimethylstyrene, allylbenzene, allyltoluene, allylnaphthalene and vinylnaphthalene. Among them, special preference is given to 3-methyl-1-butene and the like. The prepolymer derived from such a branched olefin may serve as a nucleating agent for the polypropylene and can be used for increasing the crystallinity and for improving the moldability.

The crystalline polypropylene (B-1) may be a propylene block-copolymer, which is faborable due to the superiority not only in the rigidity but also in the impact resistance, wherein a propylene block-copolymer having a rubber component (ethylene/propylene copolymer) exhibiting an intrinsic viscosity [η] of 0.5–10 dl/g is especially preferred.

For the above-mentioned other crystalline polypropylenes (B-2), any other crystalline polypropylene than the crystalline polypropylene (B-1), for example, those which have melt flow rates (MFR) at 230° C. under a load of 2160 g in the range of 1–500 g/10 min. and propylene contents in the range of 95–100 mole %, may be exemplified.

The crystalline polypropylene (B-1) and the above-mentioned other crystalline polypropylene (B-2) can be produced by a known method in the presence of a known catalyst, such as Ziegler-Natta catalyst composed of titanium trichloride and an alkylaluminum compound or a composite catalyst composed of a magnesium compound and a titanium compound. As a preferable technique for the production of the crystalline polypropylene (B-1), a method may be employed in which propylene is subjected to a polymerization alone or together with other comonomer(s) in a two-step polymerization process in the presence of a stereo-specific polymerization catalyst.

For the catalyst for producing the highly stereospecific polyolefin mentioned above, there may be employed for example, a catalyst composed of the following components (e)–(g):

(e) a solid catalyst component based on titanium, containing magnesium, titanium, halogen and an electron donating agent, (f) an organometallic compound and (g) an electron donor.

The solid catalyst component based on titanium (e) can be prepared by bringing a magnesium compound (e-1), a titanium compound (e-2) and an electron donor (e-3) into contact with each other.

As the magnesium compound (e-1), those which exhibit reducing activity and those which do not exhibit any reducing activity may be employed.

As the magnesium compound which exhibits a reducing activity, there may be enumerated those having magnesium-carbon linkage or magnesium-hydrogen linkage. Concrete examples therefor include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium and butylmagnesium hydride.

As the magnesium compound which do not exhibit reducing activity, there may be enumerated, for example, magnesium halides, such as magnesium chloride, magnesium bromide, magnesium iodide and magnesium fluoride; alkoxymagnesium halides, such as methoxymagnesium chloride, ethoxymagnesium chloride, isopropoxymagnesium chloride, butoxymagnesium chloride and octoxymagnesium chloride; aryloxymagnesium halides, such as phenoxymagnesium chloride and methylphenoxymagnesium chloride; alkoxymagnesiums, such as ethoxymagnesium, isopropoxymagnesium, butoxymagnesium, n-octoxymagnesium and 2-ethylhexoxymagnesium; aryloxymagnesiums, such as phenoxymagnesium and dimethylphenoxymagnesium; and carboxylic acid salts, such as magnesium laurate and magnesium stearate.

The magnesium compounds exhibiting no reducing activity may be those derived from magnesium compounds exhibiting reducing activity or those derived upon the preparation of a catalyst component. For deriving the magnesium compound exhibiting no reducing activity from a magnesium compound exhibiting a reducing activity, it is enough, for example, to bring the magnesium compound exhibiting a reducing activity into contact with a polysiloxane compound, a halogen-containing silane compound, a halogen-containing aluminum compound, an ester, alcohol, halogen-containing compound or an active carbon-to-oxygen linkage-containing compound, such as ketone.

The magnesium compound (e-1) may be prepared during the preparation of the catalyst from magnesium metal. The magnesium compound (e-1) may be employed in a combination of two or more of them. The magnesium compound (e-1) may be present as a complex or a composite compound with other metal(s), such as aluminum, zinc, boron, beryllium, sodium and potassium, or may be a mixture with compound(s) of other metal(s).

While, according to the present invention, many magnesium compounds other than those given above can be employed, such other magnesium compounds may favorably be present in the titanium-based solid catalyst component (e) in a form of a halogen-containing magnesium compound. Therefore, on using a magnesium compound having no halogen content, the magnesium compound should preferably be subjected to a reaction under contact with a halogen-containing compound during preparation of a catalyst component.

Among the above-mentioned magnesium compounds, especially those having no reducing activity are preferred, wherein particular preferance is given to those having halogen content, for example, magnesium chloride, alkoxymagnesium chlorides and aryloxymagnesium chlorides.

The magnesium compound (e-1) according to the present invention may preferably be used in the preparation of a catalyst component in a liquid form, wherein the magnesium compound (e-1) of a solid form can be converted into liquid form using an electron donor.

As the liquefying agent, for example, alcohols, phenols, ketones, aldehydes, ethers, amines and pyridines, which will be described afterwards as the electron donor, may be used and, further, also esters of acidic metalates, such as tetraethoxytitanium, tetra-n-propoxytitanium, tetra-i-propoxytitanium, tetrabutoxytitanium, tetrahexoxytitanium, tetrabutoxyzirconium and tetraethoxyzirconium, may be used. Among them, special preference is given to alcohols and metalate esters.

The reaction for liquefying the solid magnesium compound (e-1) may, in general, be performed by contacting the solid magnesium compound with an above-mentioned liquefying agent under, if necessary, heating. This contact with the liquefying agent may be realized usually at a temperature of 0–200° C., preferably 20–180° C., more preferably 50–150° C.

The liquefying reaction may be performed in the co-existence of a solvent, such as a hydrocarbon, for example, an aliphatic hydrocarbon, such as pentane, hexane, heptane, octane, decane, dodecane, tetradecane or kerosine; an alicyclic hydrocarbon, such as cyclopentane, methylcyclopentane, cyclohexane, methylcyclohexane, cyclooctane or cyclohexene; a halogenated hydrocarbon, such as dichloroethane, dichloropropane, trichloroethylene or chlorobenzene; or an aromatic hydrocarbon, such as benzene, toluene or xylene.

In preparing the titanium-based solid catalyst component (e), it is preferable that, for example, a tetravalent titanium compound represented by the formula (1) given below is employed as the titanium compound (e-2).

$$Ti(OR)_gX_{4-g} \quad (1)$$

In the formula (1), R represents a hydrocarbon group, X denotes a halogen atom and g is in the range of $$0 \leq g \leq 4.$$

Concrete examples of the above titanium compound represented by the formula (1) include titanium tetrahalides, such as $TiCl_4$, $TiBr_4$ and $TiI_4$; alkoxytitanium trihalides, such as $Ti(OCH_3)Cl_3$, $Ti(OC_2H_5)Cl_3$, $Ti(O-n-C_4H_9)Cl_3$, $Ti(OC_2H_5)Br_3$, and $Ti(O-iso-C_4H_9)Br_3$; dialkoxytitanium dihalides, such as $Ti(OCH_3)_2Cl_2$, $Ti(OC_2H_5)_2Cl_2$, $Ti(O-n-C_4H_9)_2Cl_2$ and $Ti(OC_2H_6)_2Br_2$; trialkoxytitanium monohalides, such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitanium, such as $Ti(OCH_3)_4$, $Ti(OC_2H_5)_4$, $Ti(O-n-C_4H_9)_4$, $Ti(O-iso-C_4H_9)_4$ and $Ti(O-2-ethylhexyl)_4$. Among them, preference is given to halogen-containing titanium compounds, especially, titanium tetrahalides, in particular, titanium tetrachloride.

The titanium compound (e-2) may be employed in combination of two or more of the compounds. The titanium compound (e-2) can be used under dilution with a solvent, such as a hydrocarbon or a halogenated hydrocarbon.

For the electron donor (e-3) to be incorporated in the preparation of the titanium-based solid catalyst component (e), there may be exemplified alcohols, phenols, ketones, aldehydes, esters of organic or inorganic acids, organic acid halides, ethers, acid amides, acid anhydrides, ammonia, amines, nitriles, isocyanates, nitrogen-containing cyclic compounds and oxygen-containing cyclic compounds. More concretely, they include alcohols having 1–18 carbon atoms, such as methanol, ethanol, propanol, pentanol, hexanol, octanol, 2-ethyl-hexanol, dodecanol, octadecyl alcohol, oleyl alcohol, benzyl alcohol, phenylethyl alcohol, cumyl alcohol, isopropyl alcohol and isopropylbenzyl alcohol; phenols having 6–20 carbon atoms which may contain lower alkyl group(s), such as phenol, cresol, xylenol, ethylphenol, propylphenol, nonylphenol, cumylphenol and naphthol; ketones having 3–15 carbon atoms, such as acetone, methyl ethyl ketone, methyl isobutyl ketone, acetophenone, benzophenone, acetylacetone and benzoquinone; and aldehydes having 2–15 carbon atoms, such as acetoaldehyde, propionaldehyde, octyl aldehyde, benzaldehyde, tolualdehyde and naphthoaldehyde.

As further examples, there may be enumerated esters of organic acids having 2–30 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexane-carboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, n-butyl maleate, diisobutyl methylmalonate, di-n-hexyl cyclohexene-carboxylate, diethyl ester of Nadic acid, diisopropyl tetrahydrophthalate, diethyl phthalate, diisobutyl phthalate, di-n-butyl phthalate, di-2-ethylhexyl phthalate, γ-butyrolactone, δ-valerolactone, cumarin, phthalide and ethyl carbonate; acid halides having 2–15 carbon atoms, such as acetyl chloride, benzoyl chloride, toluyl chloride and anisyl chloride; ethers having 2–20 carbon atoms, such as methyl ether, ethyl ether, isopropyl ether, butyl ether, amyl ether, anisole and diphenyl ether-epoxy-p-menthane; acid amides, such as acetic amide, benzoic acid amide and toluic acid amide; acid anhydrides, such as acetic anhydride, phthalic anhydride and benzoic anhydride; amines, such as methylamine, ethylamine, dimethylamine, diethylamine, ethylenediamine, tetramethylenediamine, hexamethylenediamine, tributylamine and tribenzylamine; nitriles, such as acetonitrile, benzonitrile and tolunitrile; heterocyclic nitrogen-containing compounds, for example, pyrroles, such as pyrrole, methylpyrrole and dimethylpyrrole, pyridines, such as pyrroline, pyrrolidine, indole, pyridine, methylpyridine, ethylpyridine, propylpyridine, dimethylpyridine, ethylmethylpyridine, trimethylpyridine, phenylpyridine, benzylpyridine and chloropyridine, piperidines, quinolines and isoquinolines; and heterocyclic oxygen-containing compounds, such as tetrahydrofuran, 1,4-cineole, 1,8-cineole, pinolfuran, methylfuran, dimethylfuran, diphenylfuran, benzofuran, cumaran, phthalan, tetrahydropyran, pyran and dihydropyran.

As the organic acid esters to be used as the electron donor (e-3), esters of polyvalent carboxylic acids having molecular skeleton represented by the formula (2) given below are especially preferred.

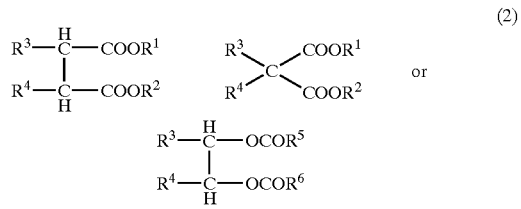

(2)

In the formula (2), $R^1$ denotes a substituted or unsubstituted hydrocarbon group, $R^2$, $R^5$ and $R^6$ denote each hydrogen atom or a substituted or unsubstituted hydrocarbon group, $R^3$ and $R^4$ represent each hydrogen atom or a substituted or unsubstituted hydrocarbon group with at least one of them being preferably a substituted or unsubstituted hydrocarbon group. $R^3$ and $R^4$ may also build up together a cyclic structure by being combined with each other. When the hydrocarbon groups $R^1$ to $R^6$ are substituted ones, the substituent groups may contain one or more heteroatoms, such as N, O and S, and may contain atom group(s) of, for example, C—O—C, COOR, COOH, OH, $SO_3H$, C—N—C and $NH_2$.

As the esters of polyvalent carboxylic acid, there may be enumerated concretely, for example, esters of aliphatic polycarboxylic acids, such as diethyl succinate, dibutyl succinate, diethyl methyl succinate, diisobutyl α-methyl glutarate, diethyl methyl malonate, diethyl ethyl malonate, diethyl isopropyl malonate, diethyl butyl malonate, diethyl phenyl malonate, diethyl diethyl malonate, diethyl dibutyl malonate, monooctyl maleate, dioctyl maleate, dibutyl maleate, dibutyl butyl maleate, diethyl butyl maleate, diisopropyl β-methyl glutarate, diallyl ethyl succinate, di-2-ethyl-hexyl fumarate, diethyl itaconate and dioctyl citraconate; esters of alicyclic polycarboxylic acids, such as diethyl 1,2-cyclohexane carboxylate, diisobutyl 1,2-cyclohexane carboxylate, diethyl tetrahydro phthalate and diethyl ester of Nadic acid; esters of aromatic polycarboxylic acids, such as monoethyl phthalate, dimethyl phthalate, methyl ethyl phthalate, monoisobutyl phthalate, diethyl phthalate, ethyl isobutyl phthalate, di-n-propyl phthalate, diisopropyl phthalate, di-n-butyl phthalate, diisobutyl phthalate, di-n-heptyl phthalate, di-2-ethyl-hexyl phthalate, di-n-octyl phthalate, dineopentyl phthalate, didecyl phthalate, benzyl butyl phthalate, diphenyl phthalate, diethyl naphthalene dicarboxylate, dibutyl naphthalene dicarboxylate, triethyl trimellitate and dibutyl trimellitate; and esters of heterocyclic polycarboxylic acids, such as 3,4-furan-dicarboxylates.

For the esters of polyvalent carboxylic acids, there may further be enumerated, for example, esters of long-chain dicarboxylic acids, such as diethyl adipate, diisobutyl adipate, diisopropyl sebacate, di-n-butyl sebacate, di-n-octyl sebacate and di-2-ethyl-hexyl sebacate.

As the electron donor (e-3), there may further be employed the organosilicic compounds and polyether compounds to be used as the electron doner component (c) described afterwards, as well as water and anionic, cationic and non-ionic surfactants.

As the electron donor (e-3), preference is given to esters of carboxylic acids, especially, to esters of polycarboxylic acids, in particular, esters of phthalic acid. The electron donor (e-3) may be employed also in combination of two or more of them.

In contacting the titanium compound (e-2), the magnesium compound (e-1) and the electron donor (e-3) with each other, it is permissible that other reaction reagent, such as silicium, phosphorus or aluminum, may be caused to be present simultaneously and it is also permissble to incorporate a solid catalyst carrier for preparing a carrier-supported solid titanium catalyst component (e).

For such carriers, there may be exemplified $Al_2O_3$, $SiO_2$, $B_2O_3$, MgO, CaO, $TiO_2$, ZnO, $SnO_2$, BaO and ThO as well as resins, such as styrene/divinylbenzene copolymer and the like. Among them, $Al_2O_3$, $SiO_2$ and styrene/divinylbenzene copolymer are employed preferably.

The titanium-based solid catalyst component (e) may be prepared by any technique including known one. Examples of such preparation technique are given below in a brief description:

(1) A technique in which a solution of the magnesium compound (e-1) in a hydrocarbon solvent containing the electron donor (the liquefying agent) (e-3) is brought into contact with the organometallic compound to cause a reaction to presipitate solid matter which is then, or in the course of precipitation, brought into contact with the titanium compound (e-2) to cause reaction.

(2) A technique in which a complex composed of the magnesium compound (e-1) and the electron donor (e-3) is brought into contact with the organometallic compound to cause reaction and, then, the titanium compound (e-2) is caused to contact and react therewith.

(3) A technique in which the contacted product from the contact of an inorganic carrier with an organomagnesium compound (e-1) is brought into contact with the titanium compound (e-2) and with the electron donor (e-3) to cause reaction therebetween. Here, it is permissible to bring the product of contact of the carrier with the magnesium compound into contact with a halogen-containing compound and/or an organometallic compound preliminarily.

(4) A technique, wherein a solid carrier, which is obtained from a mixture containing a solution of the magnesium compound (e-1), the electron donor (e-3) and the carrier in a liquid medium of the liquefying agent and, optionally, a hydrocarbon solvent and on which the magnesium compound (e-1) is supported, is contacted with the titanium compound (e-2).

(5) A technique in which a solution containing the magnesium compound (e-1), the titanium compound (e-2), the electron donor (e-3) and, optionally, a hydrocarbon solvent is brought into contact with a solid carrier.

(6) A technique in which an organomagnesium compound (e-1) in liquid form and a halogen-containing titanium compound (e-2) are brought into contact with each other. In this case, the electron donor (e-3) is used at least once.

(7) A technique in which an organomagnesium compound (e-1) in liquid form and a halogen-containing titanium compound (e-2) are brought into contact with each other, whereupon the resulting product is caused to contact with the titanium compound (e-2). In this case, the electron donor (e-3) is used at least once.

(8) A technique in which an alkoxyl group-containing magnesium compound (e-1) is brought into contact with a halogen-containing titanium compound (e-2). In this case, the electron donor (e-3) is used at least once.

(9) A technique in which a complex composed of an alkoxyl group-containing magnesium compound (e-1) and of the electron donor (e-3) is brought into contact with the titanium compound (e-2).

(10) A technique in which a complex composed of an alkoxyl group-containing magnesium compound (e-1) and the electron donor (e-3) is brought into contact with an organometallic compound, whereupon the resulting product is brought into contact with the titanium compound (e-2).

(11) A technique in which the magnesium compound (e-1), the electron donor (e-3) and the titanium compound (e-2) are brought into contact with each other in a voluntary order to cause reactions therebetween. It is permissible to incorporate a pretreatment of each reaction component before these reactions using a reaction assistant, such as an electron donor (e-3), an organometallic compound, a halogen-containing silicium compound or the like.

(12) A technique in which a liquid magnesium compound (e-1) exhibiting no reducing activity is caused to react with a liquid titanium compound (e-2) in the presence of the electron donor (e-3) to deposit a solid magnesium/titanium composite product.

(13) A technique in which the reaction product obtained in the above (12) is further reacted with the titanium compound (e-2).

(14) A technique in which the reaction product obtained in the above (11) or (12) is further reacted with the electron donor (e-3) and with the titanium compound (e-2).

(15) A technique in which a solid mixture obtained by crushing the magnesium compound (e-1), the electron donor (e-3) and the titanium compound (e-2) is treated with either an elementary halogen, a halogen compound or an aromatic hydrocarbon. In this case, it is permissible to incorporate a process step of crushing either the magnesium compound (e-1) solely, a complex composed of the magnesium compound (e-1) and of the electron donor (e-3) or the magnesium compound (e-1) and the titanium compound (e-2). It is also permissible to subject the crushed product to a pretreatment with a reaction assistant, followed by an after-treatment with, such as, an elementry halogen. As the reaction assistant, for example, an organometallic compound or a halogen-containing silicium compound, may be employed.

(16) A technique in which the magnesium compound (e-1) is crushed and the resulting crushed product is brought into contact with the titanium compound (e-2). Upon crushing and/or contacting the magnesium compound (e-1), an electron donor (e-3) may, if necessary, be employed together with a reaction assistant.

(17) A technique in which the product obtained in either of the above (11)–(16) is treated with an elementary halogen or a halogen compound or with an aromatic hydrocarbon.

(18) A technique in which a reaction product resulting after the metal oxide, the organomagnesium compound (e-1) and the halogen-containing compound are contacted with each other is caused to contact with the electron donor (e-3) and with, preferably, the titanium compound (e-2).

(19) A technique in which a magnesium compound (e-1), such as a magnesium salt of an organic acid, an alkoxymagnesium or an aryloxymagnesium, is brought into contact with the titanium compound (e-2), with the electron donor (e-3) and, if necessary, further with a halogen-containing hydrocarbon.

(20) A technique in which a solution of the magnesium compound (e-1) and an alkoxytitanium in a hydrocarbon solvent is brought into contact with the electron donor (e-3) and, if necessary, further with the titanium compound (e-2). In this case, it is favorable that a halogen-containing compound, such as a halogen-containing silicium compound, is caused to coexist.

(21) A technique in which a liquid magnesium compound (e-1) exhibiting no reducing activity is caused to react with an organometallic compound to cause a composite solid product of magnesium/metal (aluminum) to deposit out and, then, the product is reacted with the electron donor (e-3) and with the titanium compound (e-2).

While the amount of each component to be contacted may be different for each specific technique for the preparation and cannot be defined in a common rule, it is favorable to use, for example, the electron donor (e-3) in an amount in the range of 0.01–10 moles, preferably 0.1–5 moles, and the titanium compound (e-2) in an amount in the range of 0.01–1,000 moles, preferably 0.1–200 moles, respectively, per one mole of the magnesium compound (e-1).

The solid titanium catalyst component (e) prepared in the above manner contains magnesium, titanium, a halogen and an electron donor. In this solid titanium catalyst component (e), it is favorable that the atomic ratio of halogen/titanium amounts to about 2–200, preferably 4–100, the mole ratio of the electron donor/titanium amounts to about 0.01–100, preferably 0.02–10 and the atomic ratio of magnesium/titanium amounts to about 1–100, preferably 2–50.

As the organometallic compound (f) to be used together with the solid titanium catalyst component (e), those which contain a metal selected among the Group I to Group III of the periodic table are preferred. Concretely, there may be enumerated the organoaluminum compounds, alkylated complex compounds of Group I metal and aluminum and organometallic compounds of Group II metals as given below:

An organoaluminum compound (f-1) represented by the formula

$R^1_m Al(OR^2)_n H_p X_q$

In the formula, $R^1$ and $R^2$ represent each a hydrocarbon group having usually 1–15 carbon atoms, preferably 1–4 carbon atoms, which may be identical with or different from each other, X denotes a halogen atom, m is a number of $0<m\leq 3$, n is a number of $0\leq n<3$, p is a number of $0\leq p<3$ and q is a number of $0\leq q<3$, wherein m+n+p+q=3.

An alkylated complex of a Group I metal and aluminum (f-2) represented by the formula

$M^1 AlR^1_4$

In the formula, $M^1$ is Li, Na or K and $R^1$ has the same meaning as above.

A dialkylated compound of Group II or Group III metal (f-3) represented by the formula

$R^1 R^2 M^2$

In the formula, $R^1$ and $R^2$ have the same meanings as above and $M^2$ is Mg, Zn or Cd.

As the organoaluminum compound (f-1), there may be enumerated, for example, those which are represented by the formula

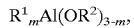
$R^1_m Al(OR^2)_{3-m}$, in which $R^1$ and $R^2$ have the same meanings as above and m is preferably of $1.5\leq m\leq 3$; those which are represented by the formula

$R^1_m AlX_{(3-m)}$, in which $R^1$ has the same meaning as above, X stands for a halogen and m is preferably of $0<m<3$; those which are represented by the formula

$R^1_m AlH_{(3-m)}$, in which $R^1$ has the same meaning as above and m is preferably of $2\leq m<3$; and those which are represented by the formula

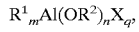
$R^1_m Al(OR^2)_n X_q$, in which $R^1$ and $R^2$ have the same meanings as above, X stands for a halogen, m is in the range $0<m\leq 3$, n is in the range $0\leq n<3$ and q is in the range $0\leq q<3$, wherein m+n+q=3.

More concretely, the organoaluminum compound (f-1) may be exemplified by trialkylaluminums, such as triethylaluminum and tributylaluminum; trialkenylaluminums, such as triisoprenylaluminum and so on; dialkylaluminum alkoxides, such as diethylaluminum ethoxide and dibutylaluminum butoxide; alkylaluminum sesquialkoxides, such as ethylaluminum sesquiethoxide and butylaluminum sesquibutoxide; partially alkoxylated alkylaluminums, such as those which have an average composition represented by a formula of, for example, $R^1_{2.5} Al(R^2)_{0.5}$; dialkylaluminum halides, such as diethylaluminum chloride, dibutylaluminum chloride and diethylaluminum bromide; alkylaluminum sesquihalides, such as ethylaluminum sesquichloride, butylaluminum sesquichloride and ethylaluminum sesquibromide; partly halogenated alkylaluminums, such as ethylaluminum dichloride, propylaluminum dichloride and butylaluminum dibromide; dialkylaluminum hydrides, such as diethylaluminum hydride and dibutylaluminum hydride; partially hydrogenated alkylaluminums, for example, alkylaluminum dihydrides, such as ethylaluminum dihydride and propylaluminum dihydride; and partially alkoxylated and halogenated alkylaluminums, such as ethylaluminum ethoxy chloride, butylaluminum butoxy chloride and ethylaluminum ethoxy bromide.

As compounds resembling the compound (f-1), there may be enumerated, organoaluminum compounds in which two or more aluminum atoms are bound together via an oxygen atom or nitrogen atom, such as for example, $(C_2H_5)_2AlOAl(C_2H_5)_2$, $(C_4H_9)_2AlOAl(C_4H_9)_2$ and $(C_2H_5)_2AlN(C_2H_5)Al(C_2H_5)_2$ as well as aluminoxanes, such as methylaluminoxane and so on.

As the alkylated complex (f-2), there may be enumerated, for example, $LiAl(C_2H_5)_4$ and $LiAl(C_7H_{15})_4$.

As the organometallic compound (f), there may be used favorably organoaluminum compounds (f-1), in particular, trialkylaluminums.

The organometallic compound may be incorporated in combination of two or more.

Concrete examples of the electron donor (g) to be used together with the titanium-based solid catalyst component (e) and the organometallic compound (f) include organosilicic compounds (g-1) represented by the formula (3) given below and compounds (g-2) having two or more ether linkages which are present under intermediation by a plurality of atoms.

$$R^1_n Si(OR^2)_{(4-n)} \quad (3)$$

In the formula (3), n is an integer of 1, 2 or 3, $R^1$ is a secondary or a tertiary hydrocarbyl when n is 1 and at least one $R^1$ may stand for a secondary or a tertiary hydrocarbyl when n is 2 or 3, the groups $R_1$ being identical with or different from each other, $R^2$ denotes a hydrocarbyl group having 1–4 carbon atoms, wherein the groups $R^2$ may be identical with or different from each other when (4−n) equals to 2 or 3.

As the secondary or tertiary hydrocarbyl group in the organosilicic compounds (g-1) represented by the formula (3), there may be enumerated cyclopentyl, cyclopentenyl, cyclopentadienyl, substituent-containing ones of them and hydrocarbyl groups having secondary or tertiary carbon atom adjoining the silicon atom. More concretely, there may be enumerated as the substituent-containing cyclopentyl group those alkyl-substituted ones, for example, 2-methylcyclopentyl, 3-methylcyclopentyl, 2-ethylcyclopentyl, 2-n-butylcyclopentyl, 2,3-dimethylcyclopentyl, 2,4-dimethylcyclopentyl, 2,5-dimethylcyclopentyl, 2,3-diethylcyclopentyl, 2,3,4-trimethylcyclopentyl, 2,3,5-trimethylcyclopentyl, 2,3,4-triethylcyclopentyl, tetramethylcyclopentyl and tetraethylcyclopentyl.

As substituted cyclopentenyl groups, there may be enumerated those alkyl-substituted ones, for example, 2-methylcyclopentenyl, 3-methylcyclopentenyl, 2-ethylcyclopentenyl, 2-n-butylcyclopentenyl, 2,3-dimethylcyclopentenyl, 2,4-dimethylcyclopentenyl, 2,5-dimethylcyclopentenyl, 2,3,4-trimethylcyclopentenyl, 2,3,5-trimethylcyclopentenyl, 2,3,4-triethylcyclopentenyl, tetramethylcyclopentenyl and tetraethylcyclopentenyl.

As substituted cyclopentadienyl groups, there may be enumerated those alkyl-substituted ones, for example, 2-methylcyclopentadienyl, 3-methylcyclopentadienyl, 2-ethylcyclopentadienyl, 2-n-butylcyclopentadienyl, 2,3-dimethylcyclopentadienyl, 2,4-dimethylcyclopentadienyl, 2,5-dimethylcyclopentadienyl, 2,3-diethylcyclopentadienyl, 2,3,4-trimethylcyclopentadienyl, 2,3,5-trimethylcyclopentadienyl, 2,3,4-triethylcyclopentadienyl, 2,3,4,5-tetramethylcyclopentadienyl, 2,3,4,5-tetraethylcyclopentadienyl, 1,2,3,4,5-pentamethylcyclopentadienyl and 1,2,3,4,5-pentaethylcyclopentadienyl.

As the hydrocarbyl groups having secondary carbon atom adjoining the silicon atom, there may be exemplified i-propyl, s-butyl, s-amyl and α-methyl-benzyl. As the hydrocarbyl groups having tertiary carbon atom adjoining the silicon atom, there may be exemplified t-butyl, t-amyl, α, α'-dimethylbenzyl and adamantyl.

The organosilicic compounds (g-1) represented by the formula (3) in which n is 1 include trialkoxysilanes, for example, cyclopentyltrimethoxysilane, 2-methylcyclopentyltrimethoxysilane, 2,3-dimethylcyclopentyltrimethoxysilane, cyclopentyltriethoxysilane, isobutyltriethoxysilane, t-butyltriethoxysilane, cyclohexyltrimethoxysilane, cyclohexyltriethoxysilane, 2-norbornanetrimethoxysilane and 2-norbornanetriethoxysilane.

When n is 2, dialkoxysilanes, such as dicyclopentyldimethoxysilane, dicyclopentyldiethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane and 2-norbornanemethyldimethoxysilane, as well as dimethoxy compounds represented by the following formula (4) may be enumerated:

(4)

In the above formula (4), $R^1$ and $R^2$ represent each independently of each other cyclopentyl, a substituted cyclopentyl, cyclopentenyl, a substituted cyclopentenyl, cyclopentadienyl, a substituted cyclopentadienyl or a hydrocarbyl having secondary or tertiary carbon atom adjoining the silicon atom.

As the dimethoxy compounds represented by the formula (4), there may be exemplified:
dicyclopentyldimethoxysilane,
dicyclopentenyldimethoxysilane,
dicyclopentadienyldimethoxysilane,
di-t-butyldimethoxysilane,
di(2-methylcyclopentyl)dimethoxysilane,
di(3-methylcyclopentyl)dimethoxysilane,
di(2-ethylcyclopentyl)dimethoxysilane,
di(2,3-dimethylcyclopentyl)dimethoxysilane,
di(2,4-dimethylcyclopentyl)dimethoxysilane,
di(2,5-dimethylcyclopentyl)dimethoxysilane,
di(2,3-diethylcyclopentyl)dimethoxysilane,
di(2,3,4-trimethylcyclopentyl)dimethoxysilane,
di(2,3,5-trimethylcyclopentyl)dimethoxysilane,
di(2,3,4-triethylcyclopentyl)dimethoxysilane,
di (tetramethylcyclopentyl)dimethoxysilane,
di(tetraethylcyclopentyl)dimethoxysilane,
di(2-methylcyclopentenyl)dimethoxysilane,
di(3-methylcyclopentenyl)dimethoxysilane,
di(2-ethylcyclopentenyl)dimethoxysilane, di(2-n-butylcyclopentenyl)dimethoxysilane,
di(2,3-dimethylcyclopentenyl)dimethoxysilane,
di (2, 4-dimethylcyclopentenyl)dimethoxysilane,
di(2,5-dimethylcyclopentenyl)dimethoxysilane,
di(2,3,4-trimethylcyclopentenyl)dimethoxysilane,
di(2,3,5-trimethylcyclopentenyl)dimethoxysilane,
di(2,3,4-triethylcyclopentenyl)dimethoxysilane,
di(tetramethylcyclopentenyl)dimethoxysilane,
di(tetraethylcyclopentenyl)dimethoxysilane,
di(2-methylcyclopentadienyl)dimethoxysilane,
di(3-methylcyclopentadienyl)dimethoxysilane,
di(2-ethylcyclopentadienyl)dimethoxysilane,
di(2-n-butylcyclopentenyl)dimethoxysilane,
di(2,3-dimethylcyclopentadienyl)dimethoxysilane,
di(2,4-dimethylcyclopentadienyl)dimethoxysilane,
di(2,5-dimethylcyclopentadienyl)dimethoxysilane,
di(2,3-diethylcyclopentadienyl)dimethoxysilane,
di(2,3,4-trimethylcyclopentadienyl)dimethoxysilane,
di(2,3,5-trimethylcyclopentadienyl)dimethoxysilane,
di(2,3,4-triethylcyclopentadienyl)dimethoxysilane,
di(2,3,4,5-tetramethylcyclopentadienyl)dimethoxysilane,
di(2,3,4,5-tetraethylcyclopentadienyl)dimethoxysilane,
di(1,2,3,4,5-pentamethylcyclopentadienyl)dimethoxysilane,
di(1,2,3,4,5-pentaethylcyclopentadienyl)dimethoxysilane,
di-t-amyldimethoxysilane,
di($\alpha,\alpha'$-dimethylbenzyl)dimethoxysilane,
di(adamantyl)dimethoxysilane,
adamantyl-t-butyldimethoxysilane,
cyclopentyl-t-butyldimethoxysilane,
diisopropyldimethoxysilane,
di-s-butyldimethoxysilane,
di-s-amyldimethoxysilane and
isopropyl-s-butyldimethoxysilane.

When in the formula (3) n is 3, there may be enumerated, for example, monoalkoxysilanes, such as tricyclopentylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane and cyclopentyldimethylethoxysilane.

For the electron donor (g), dimethoxysilanes, especially the dimethoxysilanes represented by the formula (4) are preferred and, concretely, preference is given to dicyclopentyldimethoxysilane, di-t-butyldimethoxysilane, di(2-methylcyclopentyl)dimethoxysilane, di(3-methylcyclopentyl)dimethoxysilane and di-t-amyldimethoxysilane.

The organosilicic compound (g-1) may be used in combination of two or more.

In the compound (g-2) having two or more ether linkages bound under intermediation by a plurality of atoms (referred to hereinafter sometimes as polyether) to be used as the electron donor (g), the atoms present between the ether linkages may be of one or more elements selected from the group consisting of carbon, silicon, oxygen, sulfer, phosphorus and boron, wherein the number of atoms are at least two. Among them, preference is given to those in which a relatively bulky substituent, namely, one having at least two, preferably at least three carbon atoms and a linear, branched or cyclic structure, in particular a branched or cyclic structure, is bound to the atom present between the ether linkages. Further, compounds having a plurality of, preferably 3–20, more preferably 3–10, especially 3–7, carbon atoms between two or more ether linkages are preferred.

For such polyether compound (g-2), for example, compounds represented by the formula (5) given below may be exemplified:

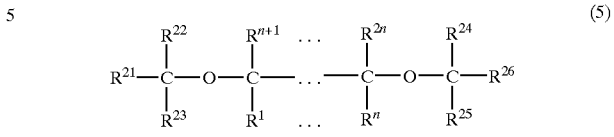

In the above formula (5), n is an integer of $2 \leq n \leq 10$, $R^1$ to $R^{26}$ denote each a substituent containing at least one element selected from the group consisting of carbon, hydrogen, oxygen, halogen, nitrogen, sulfur, phosphorus, boron and silicon, wherein voluntary substituents among $R^1$–$R^{26}$, preferably among $R^1$–$R^{2n}$ may form together a ring other than benzene ring and may contain atoms other than carbon.

Concrete examples of the polyether compound (g-2) represented by the above formula (5) include:
2-(2-ethylhexyl)-1,3-dimethoxypropane,
2-isopropyl-1,3-dimethoxypropane,
2-butyl-1,3-dimethoxypropane,
2-s-butyl-1,3-dimethoxypropane,
2-cyclohexyl-1,3-dimethoxypropane,
2-phenyl-1,3-dimethoxypropane,
2-cumyl-1,3-dimethoxypropane,
2-(2-phenylethyl)-1,3-dimethoxypropane,
2-(2-cyclohexylethyl)-1,3-dimethoxypropane,
2-(p-chlorophenyl)-1,3-dimethoxypropane,
2-(diphenylmethyl)-1,3-dimethoxypropane,
2-(1-naphthyl)-1,3-dimethoxypropane,
2-(2-fluorophenyl)-1,3-dimethoxypropane,
2-(1-decahydronaphthyl)-1,3-dimethoxypropane,
2-(p-t-butylphenyl)-1,3-dimethoxypropane,
2,2-dicyclohexyl-1,3-dimethoxypropane,
2,2-dicyclopentyl-1,3-dimethoxypropane,
2,2-diethyl-1,3-dimethoxypropane,
2,2-dipropyl-1,3-dimethoxypropane,
2,2-diisopropyl-1,3-dimethoxypropane,
2,2-dibutyl-1,3-dimethoxypropane,
2-methyl-2-propyl-1,3-dimethoxypropane,
2-methyl-2-benzyl-1,3-dimethoxypropane,
2-methyl-2-ethyl-1,3-dimethoxypropane,
2-methyl-2-isopropyl-1,3-dimethoxypropane,
2-methyl-2-phenyl-1,3-dimethoxypropane,
2-methyl-2-cyclohexyl-1,3-dimethoxypropane,
2,2-bis(p-chlorophenyl)-1,3-dimethoxypropane,
2,2-bis(2-cyclohexylethyl)-1,3-dimethoxypropane,
2-methyl-2-isobutyl-1,3-dimethoxypropane,
2-methyl-2-(2-ethylhexyl)-1,3-dimethoxypropane,
2,2-diisobutyl-1,3-dimethoxypropane,
2,2-diphenyl-1,3-dimethoxypropane,
2,2-dibenzyl-1,3-dimethoxypropane,
2,2-bis(cyclohexylmethyl)-1,3-dimethoxypropane,
2,2-diisobutyl-1,3-diethoxypropane,
2,2-diisobutyl-1,3-dibutoxypropane,
2-isobutyl-2-isopropyl-1,3-dimethoxypropane,
2-(1-methylbutyl)-2-isopropyl-1,3-dimethoxypropane,
2-(1-methylbutyl)-2-s-butyl-1,3-dimethoxypropane,
2,2-di-s-butyl-1,3-dimethoxypropane,
2,2-di-t-butyl-1,3-dimethoxypropane,
2,2-dineopentyl-1,3-dimethoxypropane,
2-isopropyl-2-isopentyl-1,3-dimethoxypropane,
2-phenyl-2-isopropyl-1,3-dimethoxypropane,
2-phenyl-2-s-butyl-1,3-dimethoxypropane,
2-benzyl-2-isopropyl-1,3-dimethoxypropane,
2-benzyl-2-s-butyl-1,3-dimethoxypropane, 2-phenyl-2-benzyl-1,3-dimethoxypropane,
2-cyclopentyl-2-isopropyl-1,3-dimethoxypropane,
2-cyclopentyl-2-s-butyl-1,3-dimethoxypropane,
2-cyclohexyl-2-isopropyl-1,3-dimethoxypropane,
2-cyclohexyl-2-s-butyl-1,3-dimethoxypropane,
2-isopropyl-2-s-butyl-1,3-dimethoxypropane,
2-cyclohexyl-2-cyclohexylmethyl-1,3-dimethoxypropane,
2,3-diphenyl-1,4-diethoxybutane,
2,3-dicyclohexyl-1,4-diethoxybutane,
2,2-dibenzyl-1,4-diethoxybutane,
2,3-dicyclohexyl-1,4-diethoxybutane,
2,3-diisopropyl-1,4-diethoxybutane,
2,2-bis(p-methylphenyl)-1,4-dimethoxybutane,
2,3-bis(p-chlorophenyl)-1,4-dimethoxybutane,
2,3-bis(p-fluorophenyl)-1,4-dimethoxybutane,
2,4-diphenyl-1,5-dimethoxypentane,
2,5-diphenyl-1,5-dimethoxyhexane,
2,4-diisopropyl-1,5-dimethoxypentane,
2,4-diisobutyl-1,5-dimethoxypentane,
2,4-diisoamyl-1,5-dimethoxypentane,
3-methoxymethyltetrahydrofuran,
3-methoxymethyldioxane,
1,3-diisobutoxypropane,
1,2-diisobutoxypropane,
1,2-diisobutoxyethane,
1,3-diisoamyloxypropane,
1,3-diisoneopentyloxyethane,
1,3-dineopentyloxypropane,
2,2-tetramethylene-1,3-dimethoxypropane,
2,2-pentamethylene-1,3-dimethoxypropane,
2,2-hexamethylene-1,3-dimethoxypropane,
1,2-bis(methoxymethyl)cyclohexane,
2,8-dioxaspiro[5,5]undecane,
3,7-dioxabicyclo[3,3,1]nonane,
3,7-dioxabicyclo[3,3,0]octane,
3,3-diisobutyl-1,5-oxononane,
6,6-diisobutyldioxyheptane,
1,1-dimethoxymethylcyclopentane,
1,1-bis(dimethoxymethyl)cyclohexane,
1,1-bis(methoxymethyl)bicyclo[2,2,1]heptane,
1,1-dimethoxymethylcyclopentane,
2-methyl-2-methoxymethyl-1,3-dimethoxypropane,
2-cyclohexyl-2-ethoxymethyl-1,3-diethoxypropane,
2-cyclohexyl-2-methoxymethyl-1,3-dimethoxypropane,
2,2-diisopropyl-1,3-dimethoxycyclohexane,
2-isopropyl-2-isoamyl-1,3-dimethoxycyclohexane,
2-cyclohexyl-2-methoxymethyl-1,3-dimethoxycyclohexane,
2-isopropyl-2-methoxymethyl-1,3-dimethoxycyclohexane,
2-isobutyl-2-methoxymethyl-1,3-dimethoxycyclohexane,
2-cyclohexyl-2-ethoxymethyl-1,3-diethoxycyclohexane,
2-cyclohexyl-2-ethoxymethyl-1,3-dimethoxycyclohexane,
2-isopropyl-2-ethoxymethyl-1,3-diethoxycyclohexane,
2-isopropyl-2-ethoxymethyl-1,3-dimethoxycyclohexane,
2-isobutyl-2-ethoxymethyl-1,3-diethoxycyclohexane,
2-isobutyl-2-ethoxymethyl-1,3-dimethoxycyclohexane,
tris (p-methoxyphenyl)phosphine,
methylphenylbis (methoxymethyl)silane,
diphenylbis(methoxymethyl)silane,
methylcyclohexylbis(methoxymethyl)silane,
di-t-butylbis(methoxymethyl)silane,
cyclohexyl-t-butylbis(methoxymethyl)silane and
i-propyl-t-butylbis(methoxymethyl)silane.

Among them, 1,3-diethers are used favorably and, in particular, 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane are preferred.

The polyether compound (g-2) may be used in combination of two or more. It is also permissible to use the polyether compound (g-2) concurrently with the organosilicic compound (g-1).

It is also possible to use it concurrently with an organosilicic compound (d) represented by the following formula (6).

$$R_nSi(OR^2)_{4-n} \qquad (6)$$

In the formula (6), R and $R^2$ represent each a hydrocarbyl group and n is 0<n<4. The organosilicic compound of the formula (6) does not include the organosilicic compound (g-1) represented by the formula (3).

Concretely, there may be enumerated, for example, trimethylmethoxysilane, trimethylethoxysilane, dimethyldimethoxysilane, dimethyldiethoxysilane, diisopropyldimethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, ethyltrimethoxysilane, ethyltriethoxysilane, vinyltrimethoxysilane, methyltrimethoxysilane, n-propyltrimethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, n-butyltriethoxysilane, phenyltriethoxysilane, γ-aminopropyltriethoxysilane, chlorotriethoxysilane, ethyltriisopropoxysilane, vinyltributoxysilane, trimethylphenoxysilane, methyltriallyloxysilane, vinyltris(β-methoxyethoxysilane) and vinyltriacetoxysilane.

Further, as analogous compounds, ethyl silicate, butyl silicate, dimethyltetraethoxydicycloxane and so on may also be used.

According to the present invention, a prepolymerization may be incorporated preliminarily for producing the crystalline polypropylene constituent (B-1) using a catalyst composed of the titanium-based solid catalyst conponent (e), the organometallic compound (f) and the electron donor (g).

In the pre-polymerization, an olefin is polymerized in the presence of a titanium-based solid catalyst component (e), an organometallic compound (f) and, if necessary, an electron donor (g).

For the olefin to be pre-polymerized, there may be used, for example, a linear olefin, such as ethylene, propylene, 1-butene, 1-octene, 1-hexadecene or 1-eicosene; or an olefin having branched structure, such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, allylnaphthalene, allylnorbornane, styrene, dimethylstyrenes, vinylnaphthalenes, allyltoluenes, allylbenzene, vinylcyclohexane, vinylcyclopentane, vinylcycloheptane or allyltrialkylsilanes. They may be co-polymerized.

Among them, as mentioned above, a branched olefin, such as 3-methyl-1-butene, 3-methyl-1-pentene, 3-ethyl-1-hexene, vinylcyclohexane, allyltrimethylsilane and dimethylstyrene, is especially preferred. In particular, a catalyst which has once been used for pre-polymerization of 3-methyl-1-butene is favorably employed, since the resulting crystalline polypropylene (B-1) will become superior in the rigidity.

The prepolymerization may favorably be carried out in such a manner that the polymerized product will be formed in an amount of about 0.1–1,000 g, preferably 0.3–500 g per 1 g of the titanium-based solid catalyst component (e). If the pre-polymerized amount is too large, the efficiency for producing the (co)polymer in the inherent polymerization may decrease.

In the prepolymerization, the catalyst may be used at a concentration considerably higher than that in the system of the inherent polymerization. The titanium-based solid catalyst component (e) may favorably be incorporated usually in a concentration of about 0.01–200 mmol, preferably about 0.05–100 mmol, calculated as the titanium atom, per one liter of the polymerization volume. The organometallic compound (f) may favorably be incorporated usually in an amount of about 0.1–100 mmol, preferably about 0.5–50 mmol, per one mole of titanium atom in the titanium-based solid catalyst component (e). The electron donor (g) may not necessarily be used in the prepolymerization, though it may be incorporated in an amount of about 0.1–50 moles, preferably 0.5–30 moles, more preferably 1–10 moles, per one mole of titanium atom in the titanium-based solid catalyst component (e).

The prepolymerization may favorably be carried out under a mild condition by adding the olefin to be pre-polymerized and the catalyst components to an inert hydrocarbon medium. As the inert hydrocarbon medium, there may be used aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride and chlorobenzene; and mixtures of them. Especially, aliphatic hydrocarbons are favorable to be used.

For the prepolymerization temperature, any temperature at which the prepolymer will not dissolve substantially in the inert hydrocarbon medium may be employed and, usually, a temperature of −20 to +100° C., preferably −20 to +80° C., more preferably 0 to +40° C., may be employed. The prepolymerization may be carried out in a batchwise or continuous process or otherwise. It is possible that a molecular weight regulation is incorporated using hydrogen gas or other means.

On producing the crystalline polypropylene (B-1), it is favorable to employ the titanium-based solid catalyst component (e) (or the catalyst which has been used for the prepolymerization) in an amount of about 0.0001–50 mmol, preferably about 0.001–10 mmol, calculated as titanium atom, per one liter of the polymerization volume. The organometallic compound (f) may favorably be used in an amount of about 1–2,000 moles, preferably about 2–500 moles, as calculated for the atomic weight of the metal per one mole of titanium atom in the polymerization system. The electron donor (g) may favorably be used in an amount of about 0.001–50 moles, preferably about 0.01–20 moles, per one mole of the metal atom of the organometallic compound (f).

On producing a crystalline polypropylene (B-1) using the catalyst described as above, known techniques can be employed. Concrete technique may comprise the following two-step process.

In the first step, a relatively high molecular weight polypropylene having an intrinsic viscosity [η], determined at 135° C. in decalin of 4–13 dl/g is produced in such an amount which will, in the final crystalline polypropylene (B-1), amount to 1–35% by weight. Then, in the second step, a relatively low molecular weight polypropylene having an intrinsic viscosity [η], determined at 135° C. in decalin, of 0.4–3 dl/g is produced in such an amount which will, in the final crystalline polypropylene (B-1), amount to 65–99% by weight.

As alternative techniques, there may be exemplified a process in which the above-mentioned two-step process is effected in reverse order of the polypropylene production and a process in which a propylene/ethylene copolymer rubber component is formed by effecting a copolymerization of propylene and ethylene, instead of the homo-polymerization of propylene in either the first or the second step in the process mentioned above. Here, the molecular weight of the polymer in each step can be adjusted by a method of, for example, altering the rate of supply of the hydrogen to the polymerization system.

The polymerization may be effected in either of gas phase polymerization or liquid phase polymerization including solution polymerization and suspension polymerization, wherein each step may be realized in a different way. It may be performed either in a batchwise, continuous or semi-continuous way. Each of the steps may be performed in a plurality of polymerization reactors, for example, in 2–10 reactors.

As the polymerization medium, inert hydrocarbon may be used and propylene in liquid state may be used therefor. The polymerization condition may be selected adequately within the ranges for the polymerization temperature of about −50° C.~200° C., preferably about 20° C.~100° C., and for the polymerization pressure of normal pressure ~9.8 MPa (normal pressure ~100 kgf/cm$^2$ gauge), preferably 0.20~4.9 MPa (about 2~50 kgf/cm$^2$ gauge).

On using a prepolymerization catalyst which has been used for the prepolymerization, the titanium-based solid catalyst component (e) and the organometallic compound (f) may be added renewedly on requirement. The organometallic compound (f) used upon the prepolymerization and upon the inherent polymerization may be identical with or different from each other. The electron donor (g) must be used at least once in either the prepolymerization or the inherent polymerization, namely, it is used only in the inherent polymerization or both in the prepolymerization and in the inherent polymerization. The electron donor (g) used upon the prepolymerization and upon the inherent polymerization may be identical with or different from each other. While it is permissible that these catalyst components are not replenished on each process step of the second step after the polymerization in the foregoing step, they may be replenished adequately.

When the catalyst as described above is used, the resulting crystalline polypropylene (B-1) will not suffer from any deterioration in the crystallinity or the stereospecificity index and no decrease in the activity of the catalyst is encountered, even in the case of using hydrogen upon the polymerization.

By the production process as described above, the content of the catalyst, especially of halogen in the crystalline polypropylene (B-1) can relatively be decreased, since the production can be attained at a high yield per a unit amount of the titanium-based solid catalyst component (e). Therefore, a procedure for removing the catalyst in the crystalline polypropylene (B-1) can be dispensed with and, at the same time, corrosion of the metal mold for molding formed articles using the finally obtained crystalline polypropylene resin composition will difficultly occur.

Now, the description is directed to the crystalline propylene block-copolymer (D). The crystalline propylene block-copolymer (D) comprises a propylene/ethylene copolymer part (Da) and a propylene homopolymer part (Db) and has a content of the 23° C. paraxylene-soluble component (a) of, with respect to the entire copolymer, 5–50% by weight, preferably 5–30% by weight, more preferably 5–25% by weight. The 23° C. paraxylene-soluble component (a) may favorably exhibit an intrinsic viscosity [η], determined at 135° C. in decalin, of 2–10 dl/g, preferably 3–8 dl/g, more preferably 3–7 dl/g, and have an ethylene content of 15–60 mole %, preferably 20–50 mole %, more preferably 30–48 mole %.

The propylene/ethylene copolymer part (Da) is composed substantially of the 23° C. paraxylene-soluble component (a). Here, the 23° C. paraxylene-soluble component (a) is a rubber component in the crystalline propylene block-copolymer (D) and comprises usually the atactic propylene homopolymer part in the crystalline propylene block-copolymer (D) in addition to the propylene/ethylene copolymer part (Da).

The 23° C. paraxylene-soluble component (a) comprised in the crystalline propylene block-copolymer (D) may have, by being copolymerised, other monomer(s) than ethylene and propylene within the range not obstructing the purpose of the present invention. Such other monomer(s) may include α-olefins, such as 1-butene, 1-pentene, 1-hexene, 1-heptene, 1-octene, 1-decene, 1-dodecene, 1-hexadecene and 4-methyl-1-pentene; vinyl compounds, such as vinylcyclopentene, vinylcyclohexane and vinylnorbornene; vinyl esters, such as vinyl acetate and so on; and unsaturated carboxylic acids, such as maleic anhydride and so on, as well as derivatives thereof.

The homo-polypropylene part (Db) is composed substantially of the 135° C. paraxylene-soluble and 23° C. paraxylene-insoluble component (b) and may favorably have a melt flow rate (MFR), as a whole of the polymer, as determined at 230° C. under a load of 2160 g, of 10–500 g/10 min., preferably 30–300 g/10 min.

The crystalline propylene block-copolymer (D) may comprise a homopolymer or copolymer of, for example, 3-methyl-1-butene, 3,3-dimethyl-1-butene, 3-methyl-1-pentene, 3-methyl-1-hexene, 3,5,5-trimethyl-1-hexene, vinylcyclopentene, vinylcyclohexane and vinylnorbornene, as a prepolymer formed by the prepolymerization. If such a prepolymer is comprised in a small amount, for example, 1 ppm—3% by weight, the crystallinity of the crystalline propylene block-copolymer (D) becomes increased.

The crystalline propylene block-copolymer (D) may have a melt flow rate (ASTM D 1238, 230° C., 2160 g load), for the block-copolymer (D) as a whole, of 5–300 g/10 min., preferably 20–200 g/10 min.

The crystalline propylene block-copolymer (D) may be used alone or in combination of two or more. The crystalline propylene block-copolymer (D) can be produced by a known process using a known catalyst, such as that exemplified above for the polymerization catalyst for the crystalline polypropylene (B-1).

The 135° C. paraxylene-insoluble component (c) is composed substantially of the filler constituent (c1). Concrete examples of the filler constituent (c1) include fillers (C), for example, spherical fillers, such as calcium carbonate and barium sulfate; plate-formed fillers, such as talc and mica; and fibrous fillers, such as carbon fiber, glass fiber, potassium titanate, magnesium oxysulfate, wollastonite and ceramic fibers. They may be surface-treated. Among them, talc is preferred, in particular, talc having an average particle size of 1–5 μm, preferably 1–3 μm, is favorable.

The content of each component of the crystalline polypropylene resin composition according to the present invention may be 3–65% by weight, preferably 20–35% by weight, more preferably 22–30% by weight for the component (a), 35–97% by weight, preferably 43–65% by weight, more preferably 50–62% by weight for the component (b) and 0–30% by weight, preferably 15–22% by weight, more preferably 16–20% by weight for the component (c).

While it is favorable in the crystalline polypropylene resin composition according to the present invention that the component (a) is composed substantially of the elastomeric constituent (a1) and even entirely of the elastomeric constituent (a1), it is permissible that constituent(s) soluble in 23° C. paraxylene, such as an atactic polypropylene having low crystallinity, other than the elastomeric constituent (a1), are comprised in a small amount, for example, 10% by weight or less, preferably 5% by weight or less. While the component (b) may be composed substantially of the crystalline polypropylene constituent (b1) and favorably composed entirely of the crystalline polypropylene constituent (b1), it is permissible that constituent(s) soluble in 135° C. paraxylene and insoluble in 23° C. paraxylene other than the crystalline polypropylene constituent (b1) are comprised in a small amount, for example, 10% by weight or less, preferably 5% by weight or less. The component (c) may be composed substantially of the filler constituent (c1) and composed entirely of the filler constituent (c1), though other constituents insoluble in 135° C. paraxylene than the filler constituent (c1) may be comprised in a small amount.

The crystalline polypropylene resin composition according to the present invention can be prepared by blending or melt-mixing the resin components and the ingredients, such as filler and additive, on an adequate mixing means, such as Bumbury's mixer, mono- or bi-axial extruder or high-speed biaxial extruder, in such a mixing ratio that the resulting mixture will have contents of the components (a) to (c) each in the range given above and that the components (a), (b) and (c) will be composed substantially of the elastomeric constituent (a1), the crystalline polypropylene constituent (b1) and the filler constituent (cl), respectively.

As the polymers to be blended upon the prepararion of the crystalline polypropylene resin composition according to the present invention, polymers to be served in the blended resin composition as the elastomeric constituent (a1) and/or as the crystalline polypropylene constituent (b1) may be used without any restriction. Concretely, there may be enumerated therefor the elastomers (A) for (A-1) to (A-3), the crystalline polypropylenes (B) for (B-1) and (B-2) and the crystalline propylene block-copolymer (D).

Concrete mixing ratio of the elastomeric component (A), the crystalline polypropylene component (B), the filler component (C) and the propylene-based crystalline block-copolymer component (D) which is used on preparing the resin composition based on crystalline polypropylene according to the present invention may favorably be, as the weight ratio of (A)/(B)/(C)/(D), in the range of (3~99)/(1~97)/(0~30)/(0~96), preferably (3~40)/(1~50)/(0~30)/(10~96), with the total sum of (A)–(D) being 100 parts by weight. By blending these components in such a ratio, the resin composition based on crystalline polypropylene according to the present invention can easily be obtained. Since the components (A), (B) and (D) can be produced each in a simple manner with high productivity by a known process using the catalyst and so on as given above, the resin composition based on crystalline polypropylene according to the present invention can be prepared at a low cost.

The resin composition based on crystalline polypropylene according to the present invention obtained in this manner is superior in the mechanical properties, such as strength and so on and can be molded by molding techniques, such as injection molding and so on, into articles exhibiting superior appearances without suffering from occurrence of flow marks and without forming rashes due to polymer gel.

In the resin composition based on crystalline polypropylene according to the present invention, other polymer(s), such as polyolefin, engineering plastics or rubber, may further be incorporated on requirement within a range of not obstructing the purpose of the present invention. If necessary, it is permissible to further incorporate in the resin composition based on crystalline polypropylene according to the present invention other additives which have conventionally been used in resin compositions based on polyolefin, such as heat stabilizer, antistatic agent, weathering stabilizer, light stabilizer, antiaging agent, antioxidant, softener, dispersant, filler, coloring agent and lubricant, in amounts not obstructing the purpose of the present invention.

The resin composition based on crystalline polypropylene according to the present invention can be used as the material in the field in which polypropylene has found its use, for example, for interior and exterior ornamental parts for automobile, housings of domestic electric instruments, office supplies, household articles and miscellaneous articles.

The articles made from the resin composition based on crystalline polypropylene according to the present invention, such as exterior articles of automobile and the like, have superior mechanical properties and are also superior in the appearance without exhibiting flow mark. For molding these articles, injection molding is adapted, though other known techniques, such as extrusion molding and blow molding, may be employed.

As detailed above, the resin composition based on crystalline polypropylene according to the present invention can be processed into articles exhibiting superior appearance by injection molding without suffering from occurrence of flow mark and without causing rashes due to the existing polymer gels, while attaining superior mechanical properties, such as flexural modulus and so on, with better flowability upon the molding, because the resin composition have contents of specific elastomers and specific crystalline polypropylene constituents in a specific proportion range. Due to the fact that the resin composition based on crystalline polypropylene according to the present invention is prepared from starting materials obtainable at a high productivity, the composition can be obtained at a lower cost.

THE BEST MODE FOR EMBODYING THE INVENTION

Below, the present invention will be described by way of Examples, wherein the present invention should never be restricted by these Examples. In the disclosures of the following Examples, the paraxylene-fractionation is performed in the manner as follows. Namely, 5 g of the resulting resin composition based on crystalline polypropylene were introduced into 500 ml of paraxylene at 135° C. and the mixture was agitated sufficiently to dissolve completely the soluble ingredients (soluble polymer components). Then, the mixture was cooled to a temperature of 23° C. and was stood still for 24 hours. Then, this paraxylene solution was subjected to a centrifugation and the separated liquid phase was decanted into 1,000 ml of acetone to cause deposition of a polymer ingredient. This precipitate was processed by filtration, washing and drying to obtain a solid matter which is designated as the 23° C. paraxylene-soluble component (a). On the other hand, the separated precipitate phase after the centrifugation was subjected to a solvent extraction with 300 ml of paraxylene on a Soxhlet extraction apparatus furnished with a cylindrical filter paper at 135° C. for 6 hours to separate into a soluble ingredient and an insoluble ingredient. The soluble ingredient was decanted into 600 ml of acetone to cause deposition of the polymer. This deposit was processed by filtration, washing and drying to obtain a solid matter which was designated as the 135° C. paraxylene-soluble and 23° C. paraxylene-insoluble component (b). The residual insoluble matter upon the Soxhlet extraction was processed by washing and drying to obtain a solid matter which was designated as the 135° C. paraxylene-insoluble component (c).

EXAMPLES 1 to 10 AND COMPARATIVE EXAMPLES 1 to 7

1) Preparation of the Resin Composition Based on Crystalline Polypropylene

Using the elastomer products as given in Table 1 and the crystalline polypropylene products as given in Table 2 as well as the talc given in Table 3, the resin compositions based on crystalline polypropylene as given in Tables 4 and 5 were prepared.

TABLE 1

|  | Elastomer | | | | |
| --- | --- | --- | --- | --- | --- |
|  | X-1 | X-2 | X-3 | X-4 | X-5 |
| Content (wt. %) of | | | | | |
| Styrene | 0 | 0 | 13 | 30 | 40 |
| Ethylene | 69 | 72 | — | — | — |
| Propylene | 29 | 25 | — | — | — |
| 5-ethylidene-2-norbornene | 2 | 3 | — | — | — |
| 23° C. p-xylene-soluble component | 100 | 100 | 100 | 100 | 100 |
| Intrinsic viscosity *1 (dl/g) | 2.3 | 1.2 | 1.1 | 1.6 | 1.4 |
| MFR (g/10 min.) *2 | 0.4 | 7.3 | 9 | 2 | 5 |
| Polymer type *3 | EPDM | EPDM | SEBS | SEBS | SEBS |

Notes:
*1 Determined in decalin at 135° C.
*2 Determined at 230° C. under a load of 2160 g
*3 EPDM = ethylene/propylene/diene terpolymer
SEBS = styrene/ethylene/butene/styrene block-copolymer

TABLE 2

|  | Crystalline polypropylene (PP) | | | | | |
| --- | --- | --- | --- | --- | --- | --- |
|  | Y-1 | Y-2 | Y-3 | Y-4 | Y-5 | Y-6 |
| MFR (g/10 min.) *1 | 60 | 58 | 56 | 60 | 58 | 60 |
| Ethylene content (wt. %) | 0 | 0 | 0 | 0 | 3.0 | 0 |
| 23° C. p-xylene-soluble component | — | — | — | — | EPR | — |
| Wt. % of 23° C. p-xylene-sol. comp. | 0 | 0 | 0 | 0 | 11.5 | 0 |
| Wt. % of 135° C. p-xylene-sol. comp. | 100 | 100 | 100 | 100 | 100 | 100 |
| mmmm (%) *2 | 98.6 | 98.5 | 98.7 | 98.4 | 98.1 | 96.4 |
| Mw/Mn *3 | 11.0 | 25.5 | 6.0 | 37.1 | 7.6 | 11.3 |
| Mz/Mw *3 | 10.2 | 9.3 | 3.6 | 5.7 | 10.6 | 10.5 |

Notes *1: Determined at 230° C. under a load of 2160 g.
*2: Isotactic pentad proportion (mmmm) determined as the proportion of mmmm peak among the total absorption peaks in the methyl carbon region in the $^1$ $^3$C-NMR spectrum.
*3: Conditions for the determination of number-average molecular weight (Mn), weight-average molecular weight (Mw) and z-average molecular weight (Mz) were as follows:
GPC : Model 150 C of the firm Waters.
Column: Model PL mixed B of the firm Polymer Laboratories.
Amount of the sample = 400 μl with polymer concentration of 0.15% by weight.
Temperature: 135° C.
Solvent: o-dichlorobenzene
Mn, Mw ans Mz for each sample were determined under calibration onto each calibration curve prepared preliminarily using standard polystyrenes supplied from the firm Polymer Laboratories. For the analysis, an analysis software "Millenium" supplied from the firm Waters.

TABLE 3

|  | Filler | |
| --- | --- | --- |
|  | Z-1 | Z-2 |
| Material | Talc | Talc |
| Average particle size (μm) | 2.4 | 6.3 |

TABLE 4

| Component (proportion in weight %) | Example 1 | Example 2 | Example 3 | Example 4 | Example 5 | Example 6 | Comparat. Example 1 | Comparat. Example 2 | Comparat. Example 3 |
|---|---|---|---|---|---|---|---|---|---|
| Elastomers | | | | | | | | | |
| X-1 | 30 | 30 | 26 | 24 | 16 | 22 | 30 | 30 | 24 |
| X-2 | — | — | — | — | — | 11 | — | — | — |
| X-3 | — | — | — | — | 8 | — | — | — | — |
| X-4 | — | — | — | — | — | — | — | — | — |
| X-5 | — | — | — | — | — | — | — | — | — |
| Crystalline PP | | | | | | | | | |
| Y-1 | 50 | — | 27 | 56 | 56 | 51 | — | — | — |
| Y-2 | — | 50 | — | — | — | — | — | — | — |
| Y-3 | — | — | — | — | — | — | 50 | — | 56 |
| Y-4 | — | — | — | — | — | — | — | 50 | — |
| Y-5 | — | — | 27 | — | — | — | — | — | — |
| Y-6 | — | — | — | — | — | — | — | — | — |
| Talc | | | | | | | | | |
| Z-1 | 20 | 20 | 20 | 20 | 20 | 16 | 20 | 20 | 20 |
| Z-2 | — | — | — | — | — | — | — | — | — |
| Component (a) *1 | 30 | 30 | 30 | 24 | 24 | 33 | 30 | 30 | 24 |
| Component (b) *2 | 50 | 50 | 50 | 56 | 56 | 51 | 50 | 50 | 56 |
| Component (c) *3 | 20 | 20 | 20 | 20 | 20 | 16 | 20 | 20 | 20 |

Notes *1, *2 and *3: See under Table 5.

TABLE 5

| Component (proportion in weight %) | Example 7 | Example 8 | Example 9 | Example 10 | Comparative Example 4 | Comparative Example 5 | Comparative Example 6 | Comparative Example 7 |
|---|---|---|---|---|---|---|---|---|
| Elastomers | | | | | | | | |
| X-1 | — | — | — | — | — | — | — | — |
| X-2 | — | — | — | — | — | — | — | — |
| X-3 | 12 | 12 | 11 | — | 12 | 12 | — | 12 |
| X-4 | 12 | 12 | 11 | 26 | 12 | 12 | — | 12 |
| X-5 | — | — | — | — | — | — | 24 | — |
| Crystalline PP | | | | | | | | |
| Y-1 | 56 | — | 29 | 54 | — | — | 56 | — |
| Y-2 | — | 56 | — | — | — | — | — | — |
| Y-3 | — | — | — | — | 56 | — | — | — |
| Y-4 | — | — | — | — | — | 56 | — | — |
| Y-5 | — | — | 29 | — | — | — | — | — |
| Y-6 | — | — | — | — | — | — | — | 56 |
| Talc | | | | | | | | |
| Z-1 | 20 | 20 | 20 | 20 | 20 | 20 | 20 | 20 |
| Z-2 | — | — | — | — | — | — | — | — |
| Component (a) *1 | 24 | 24 | 24 | 26 | 24 | 24 | 24 | 24 |
| Component (b) *2 | 56 | 56 | 56 | 54 | 56 | 56 | 56 | 56 |
| Component (c) *3 | 20 | 20 | 20 | 20 | 20 | 20 | 20 | 20 |

Notes *1 The 23° C. paraxylene-soluble component (a).
*2 The 135° C. paraxylene-soluble and 23° C. paraxylene-insoluble component (b).
*3 The 135° C. paraxylene-insoluble component (c).

2) Material Properties of the Resin Composition Based on Crystalline Polypropylene For the resin compositions based on crystalline polypropylene given in Tables 4 and 5, the material properties etc. were examined. The test specimens employed in the tests were prepared by injection molding each composition on an injection molding machine (Model J100 SA II of The Japan Steel Works, Ltd.) at a cylinder set temperature of 230° C. and a metal mold temperature of 40° C. . The results are given in Tables 6 and 7.

TABLE 6

| | | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Component (a1) | Content (wt. %) | 30 | 30 | 30 | 24 | 24 | 33 | 30 | 30 | 24 |
| | Styrene content (wt. %) | 0 | 0 | 0 | 0 | 4 | 0 | 0 | 0 | 0 |
| | Intrinsic viscos. (dl/g) *1 | 2.3 | 2.3 | 3.4 | 2.3 | 1.7 | 1.9 | 2.3 | 2.3 | 2.3 |
| Component (b1) | Content (wt. %) | 50 | 50 | 50 | 56 | 56 | 51 | 50 | 50 | 56 |
| | mmmm (%) *2 | 98.6 | 98.5 | 98.3 | 98.6 | 98.6 | 98.6 | 98.7 | 98.4 | 98.7 |
| | Mw/Mn *3 | 11.0 | 25.5 | 9.3 | 11.0 | 11.0 | 11.0 | 6.0 | 37.1 | 6.0 |
| | Mz/Mw *3 | 10.2 | 9.3 | 10.4 | 10.2 | 10.2 | 10.2 | 3.6 | 5.7 | 3.6 |
| | CFC-Mw (× $10^5$, 121° C.) *4 | 4.0 | 13.5 | 3.7 | 4.1 | 4.0 | 4.1 | 2.5 | 3.4 | 2.6 |
| | $C_2$-mM (wt. %) *5 | 0 | 0 | 17 | 0 | 0 | 0 | 0 | 0 | 0 |
| Component (c1) | Content (wt. %) | 20 | 20 | 20 | 20 | 20 | 16 | 20 | 20 | 20 |
| | Average particle size (μm) | 2.4 | 2.4 | 2.4 | 2.4 | 2.4 | 2.4 | 2.4 | 2.4 | 2.4 |
| Features of the composition | MFR (g/10 min.) *6 | 12 | 11 | 13 | 14 | 18 | 21 | 12 | 10 | 15 |
| | FM (MPa) *7 | 1850 | 1960 | 1830 | 2150 | 2170 | 1720 | 1740 | 1810 | 1960 |
| | IZ (J/m) *8 | 650 | 560 | 600 | 300 | 400 | 615 | 640 | 150 | 290 |
| | HR (Rockwell R) *9 | 47 | 49 | 48 | 71 | 71 | 50 | 43 | 46 | 66 |
| | BT (° C.) *10 | −40.2 | −37.2 | −39.1 | −20.5 | −25.5 | −42.7 | −40.3 | −2.3 | −18.4 |
| | Flow mark occur. rate (%) *11 | 24 | 26 | 24 | 15 | 16 | 23 | 89 | 53 | 68 |

TABLE 7

|  |  | Example | | | | Comparative Example | | | |
| --- | --- | --- | --- | --- | --- | --- | --- | --- | --- |
|  |  | 7 | 8 | 9 | 10 | 4 | 5 | 6 | 7 |
| Component (a1) | Content (wt. %) | 24 | 24 | 24 | 26 | 24 | 24 | 24 | 24 |
|  | Styrene content (wt. %) | 22 | 22 | 19 | 30 | 22 | 22 | 40 | 22 |
|  | Intrinsic viscos. (dl/g) [*1] | 1.3 | 1.3 | 1.8 | 1.6 | 1.3 | 1.3 | 1.4 | 1.3 |
| Component (b1) | Content (wt. %) | 56 | 56 | 56 | 54 | 56 | 56 | 56 | 56 |
|  | mmmm (%) [*2] | 98.6 | 98.4 | 98.3 | 98.6 | 98.7 | 98.4 | 98.6 | 96.4 |
|  | Mw/Mn [*3] | 11.0 | 25.5 | 9.3 | 11.0 | 6.0 | 37.1 | 11.0 | 11.3 |
|  | Mz/Mw [*3] | 10.2 | 9.3 | 10.4 | 10.2 | 3.8 | 5.7 | 10.2 | 10.5 |
|  | CFC-Mw (× 10⁵, 121° C.) [*4] | 4.0 | 13.5 | 3.7 | 4.1 | 2.5 | 3.4 | 4.0 | 4.1 |
|  | $C_2$-mM (wt. %) [*5] | 0 | 0 | 18 | 0 | 0 | 0 | 0 | 0 |
| Component (c1) | Content (wt. %) | 20 | 20 | 20 | 20 | 20 | 20 | 20 | 20 |
|  | Average particle size (μm) | 2.4 | 2.4 | 2.4 | 2.4 | 2.4 | 2.4 | 2.4 | 2.4 |
| Features of the composition | MFR (g/10 min.) [*6] | 29 | 27 | 30 | 28 | 31 | 27 | 27 | 28 |
|  | FM (MPa) [*7] | 2520 | 2580 | 2320 | 2570 | 2480 | 2630 | 2610 | 2210 |
|  | IZ (J/m) [*8] | 371 | 353 | 460 | 332 | 350 | 150 | 190 | 383 |
|  | HR (Rockwell R) [*9] | 82 | 84 | 80 | 83 | 79 | 83 | 86 | 72 |
|  | BT (° C.) [*10] | −32.3 | −30.1 | −31.1 | −30.2 | −32.8 | 3.5 | −2.1 | −31.7 |
|  | Flow mark occur. rate (%) [*11] | 28 | 26 | 24 | 30 | 89 | 27 | 30 | 27 |

Notes in Tables 6 and 7:

[*1]: Intrinsic viscosity determined in decalin at 135° C.

[*2]: See Table 2.

[*3]: See Table 2.

[*4]: CFC-Mw (× 10⁵, 121° C.): Cross fractionation chromatography (CFC) was carried out using an apparatus as described below having a unit for temperature rising elution fractionation (TREF) for effecting compositional fractionation and a unit for GPC for effecting a molecular weight fractionation under the conditions as given below to determine the weight-average molecular weight (Mw) of the 121° C.-elution fraction:

Apparatus: CFC Model T-150 A (trademark, supplied from the firm Mitsubishi Petrochemical Co., Ltd.).

Column: Shodex AT-806 MS (three sets).

Eluent: o-dichlorobenzene.

Flow rate: 1.0 ml/min.

Sample concentration: 0.3% by weight/volume (containing 0.1% BHT).

Amount injected: 0.5 ml.

Condition: Complete dissolution.

Detector: Infrared absorption spectrometer with 3.42 μ (2924 cm⁻¹) NaCl plate.

Elution temperature: 0 – 135° C. for 28 fractions: 0, 10, 20, 30, 40, 45, 50, 55, 60, 65, 70, 75, 80, 85, 90, 94, 97, 100, 103, 106, 109, 112, 115, 118, 121, 124, 127 and 135° C.

[*5]: $C_2$-mM: The content of ethylene in the highest molecular weight fraction of GPC (mM), which was determined under the condition as follows:

GPC: Model 150 CV of the firm Waters.

Column: PL mixed A, supplied from the firm Polymer Laboratories.

Amount of sample: 400 μl (with a polymer concentration of 0.3% by weight).

FT-IR: System 2,000 of the firm Parkin-Elmer.

Detection temperature: 135° C.

Solvent: o-dichlorobenzene.

[*6]: MFR was determined in Examples 1 – 6 and Comparative Examples 1 – 3 in accordance with the method prescribed in JIS K 7210 and, in Examples 7 – 10 and Comparative Examples 4 – 7, in accordance with that of ASTM D 1238.

[*7]: FM represents the flexural modulus, which was determined by the method prescribed in JIS K 7203 in Examples 1 – 6 and in Comparative Examples 1 – 3 as well as by the method prescribed in ASTM D 790 in Examples 7 – 10 and in Comparative Examples 4 – 7.

[*8]: IZ represents Izod impact strength, which was determined in Examples 1 – 6 and in Comparative Examples 1 – 3 by the method prescribed in JIS K 7110 and in Examples 7 – 10 and Comparative Examples 4 – 7 by the method prescribed in ASTM D 256, at a temperature of 23° C. in each testing.

[*9]: HR denotes surface hardness, which was determined in Examples 1 – 6 and in Comparative Examples 1 – 3 by the method prescribed in JIS K 7202 and in Examples 7 – 10 and Comparative Examples 4 – 7 by the method prescribed in ASTM D 685. In both methods, R was used for the steel sphere and evaluation was expressed in terms of R-scale.

[*10]: BT denotes the brittle temperature, which was determined in Examples 1 – 6 and in Comparative Examples 1 – 3 by the method prescribed in JIS K 7216 and in Examples 7 – 10 and Comparative Examples 4 – 7 by the method prescribed in ASTM D 746.

[*11]: This related to occurrence rate of flow mark which is a regular pattern in stripes appearing on the face of molding in the direction vertical to the resin flow due to imperfect transference of the mold face form onto the molded article and belongs to a defect of appearance. The flow mark occurrence rate was determined by effecting an injection molding of the composition on an injection molding machine using a
a metal mold having an injection path of a spiral form having a length of 2,000 mm, a width of 10 mm and a thickness of 3 mm, wherein the flow distance from the path inlet to the point at which a flow mark begins to occur was observed, in order to determine the ratio of the path length within which the flow mark exists to the entire path length, which ratio was taken as the flow mark occurrence rate.

The elastomers used in Examples 11 and below and in Comparative Examples 8 and below are recited in Tables 8 and 9.

TABLE 8

| | Elastomer [1] | | | | |
|---|---|---|---|---|---|
| | X-1 | X-2 | X-3 | X-4 | X-5 |
| MFR (g/10 min,) [2] | 0.4 | 7.3 | 9 | 2 | 5 |
| Styrene (wt. %) | — | — | 13 | 30 | 40 |
| Ethylene (wt. %) | 69 | 72 | — | — | — |
| Propylene (wt. %) | 29 | 25 | — | — | — |
| ENB (wt. %) [3] | 2 | 3 | — | — | — |
| I.V. (dl/g) [4] | 2.3 | 1.2 | 1.1 | 1.6 | 1.4 |
| Polymer type [5] | EPDM | EPDM | SEBS | SEBS | SEBS |

Notes: [1] Elastomers designated by the same identification symbols as in Table 1 are the same as those in Table 1.
X-1 = EP57P (trademark, a product of JSR K.K.)
X-2 = MITSUI EPT X3012P (trademark, a product of Mitsui Chemicals Inc.)
X-3 = KRATON G1657 (trademark, a product of Shell Japan K.K.
X-4 = KRATON G1652 (trademark, a product of Shell Japan K.K.
X-5 = TUFTEC H1051 (trademark, a product of Asahi Chemical Ind. Co., Ltd.
[2] MFR was determined at 230° C. under a load of 2160 g
[3] ENB = 5-ethylidene-2-norbornene
[4] I.V. = intrinsic viscosity, which was determined in decalin at 135° C.
[5] EPDM = ethylene/propylene/diene terpolymer,
SEBS = styrene/ethylene/butylene/styrene block-copolymer

TABLE 9

| | Elastomer [1] | | | | |
|---|---|---|---|---|---|
| | X-6 | X-7 | X-8 | X-9 | X-10 |
| MFR (g/10 min,) [2] | 0.5 | 0.5 | 2 | 2 | 2 |
| Styrene (wt. %) | 65 | — | — | — | — |
| Ethylene (wt. %) | — | 35 | 72 | 70 | 74 |
| Propylene (wt. %) | — | 65 | 28 | — | — |
| ENB (wt. %) [3] | — | — | — | — | — |
| I.V. (dl/g) [4] | 1.5 | 2.8 | 1.8 | 1.9 | 1.7 |
| Polymer type [5] | SEPS | PER | EPR | EBR | EOR |

Notes: [1] X-6 = SEPTON 2104 (trademark, a product of Kuraray Co., Ltd.)
X-7 = TAFMER S4030 (trademark, a product of Mitsui Chemicals Inc.)
X-8 = TAFMER P0480 (trademark, a product of Mitsui Chemicals Inc.)
X-9 = TAFMER A1050 (trademark, a product of Mitsui Chemicals Inc.)
X-10 = ENGAGE EG8100 (trademark, a product of DuPont-Dow Elastomer K.K.)
[2] MFR was determined at 230° C. under a load of 2160 g
[3] ENB = 5-ethylidene-2-norbornene
[4] I.V. = intrinsic viscosity, which was determined in decalin at 135° C.
[5] SEPS = styrene/ethylene/propylene/styrene block-copolymer
PER = propylene/ethylene rubber
EPR = ethylene/propylene rubber
EBR = ethylene/1-butene rubber
EOR = ethylene/1-octene rubber The fillers used in Examples and in Comparative Examples are given in Table 10.

TABLE 10

| | Filler [1] | | | | |
|---|---|---|---|---|---|
| | Z-1 | Z-2 | Z-3 | Z-4 | Z-5 |
| Material | Talc | Talc | Talc | CaCO$_3$ | G.F. [2] |
| Average particle size (μm) | 2.4 | 6.3 | 1.2 | 1.0 | 9 [3] |

Notes: [1] Fillers designated by the same symbols as in Table 3 are the same as those in Table 3.
[2] G.F. = glass fiber, a chopped strand.
[3] Average diameter of fiber.

PRODUCTION EXAMPLE 1

Polymerization of Crystalline Polypropylene [1]

(1) Preparation of Titanium-based Solid Catalyst Component [1]

A vibration mill provided with four crusher pots having each an internal volume of 4 liters containing 9 kg of steel balls of a diameter of 12 mm was employed. Each pot was charged with 300 g of magnesium chloride, 115 ml of diisobutyl phthalate and 60 ml of titanium tetrachloride and the charged contents were subjected to crushing for 40 hours under a nitrogen atmosphere. 5 g of the resulting co-crushed mixture were placed in a 200 ml flask, whereto 100 ml of toluene were added and the mixture was agitated at 114° C. for 30 minutes and, then, was stood still and the supernatant was removed. The resulting solid matter was then washed three times with each 100 ml of n-heptane at 20° C. and the so-washed product was suspended in 100 ml of n-heptane to obtain a titanium-based solid catalyst slurry. This titanium-based solid catalyst had a titanium content of 2.0% by weight and a diisobutyl phthalate content of 18% by weight.

(2) Polymerization of Crystalline Polypropylene Y-1

An autoclave having an inner volume of 20 liters was charged, under a nitrogen atmosphere, with 7.9 liters of heptane, 0.92 g of diluted triethylaluminum, 1.86 g of dicyclopentyldimethoxysilane (DCPMS) and 0.48 g of the titanium-based solid catalyst obtained as above. The nitrogen atmosphere was evacuated using a vacuum pump and the autoclave was then charged with propylene. Then, heating of the autoclave was started, while supplying propylene to the autoclave continuously in such a manner that the autoclave was maintained under a condition of no hydrogen ($H_2$ concentration 1), a temperature of 60° C. and a reactor inner pressure (reactor inner pressure 1) of 0.1 MPa (1.0 kgf/cm$^2$ gauge) to continue the polymerization for 0.25 hour (polymerization duration 1). When sampling a part of the slurry in the autoclave after the polymerization, the intrinsic viscosity [η] of the polymer was found to be 9.8 dl/g (the first step polymerization was over).

Then, the autoclave internal temperature was elevated to 70° C. and thereto was supplied propylene and hydrogen continuously so as to maintain a reactor inner pressure (reactor inner pressure 2) of 0.69 MPa (7.0 kgf/cm$^2$, gauge) and a hydrogen concentration in the gas phase ($H_2$ concentration 2) of 30 volume % to conduct the polymerization for 5.0 hours (polymerization duration 2) (the second step polymerization was over). After the polymerization, 0.97 ml of methanol was introduced into the autoclave to terminate the polymerization, whereupon the resulting product was purified and dried in an ordinary method to obtain 4.5 kg of a powdery crystalline polypropylene product Y-1. The material properties thereof are recited in Table 12.

PRODUCTION EXAMPLES 2–12

The same procedures as in Production Example 1 were pursued to produce crystalline polypropylene products Y-2, Y-3 and Y-7 to Y-15, except that the polymerization condition was altered to that given in Table 11. The results are recite in Tables 12 and 13.

TABLE 11

| Prod. Example No. | Crystalline PP product used *1 | 1st step polymerization | | | 2nd step polymerization | | |
|---|---|---|---|---|---|---|---|
| | | H$_2$ Vol. % *2 | P. in MPa *3 | Time (hr) *4 | H$_2$ Vol. % *5 | P. in MPa *6 | Time (hr) *7 |
| 1 | Y-1 | 0 | 0.10 | 0.25 | 30 | 0.69 | 5.0 |
| 2 | Y-2 | 0 | 0.29 | 1.0 | 40 | 0.78 | 3.0 |
| 3 | Y-3 *8 | 21 | 0.69 | 2.0 | — | — | — |
| 4 | Y-7 | 0.04 | 0.15 | 1.0 | 78 | 0.78 | 4.0 |
| 5 | Y-8 | 0 | 0.29 | 0.25 | 61 | 0.71 | 8.5 |
| 6 | Y-9 | 0.04 | 0.25 | 1.5 | 63 | 0.78 | 9.0 |
| 7 | Y-10 | 0 | 0.10 | 0.25 | 32 | 0.69 | 3.0 |
| 8 | Y-11 | 0 | 0.10 | 5.0 | — | — | — |
| 9 | Y-12 | 0.04 | 0.25 | 5.0 | — | — | — |
| 10 | Y-13 *8 | 34 | 0.69 | 2.2 | — | — | — |
| 11 | Y-14 *8 | 36 | 0.69 | 2.3 | — | — | — |
| 12 | Y-15 *8 | 12 | 0.69 | 1.5 | — | — | — |

Notes
*1: The crystalline polypropylene (PP) products indicated by the same identification symbols as in Table 2 are the same as those in Table 2.
*2: H$_2$ concentration 1 expressed by volume %.
*3: Reactor inner pressure 1 expressed by MPa, gauge.
*4: Polymerization duration 1 expressed by hr.
*5: H$_2$ concentration 2.
*6: Reactor inner pressure 2 expressed by MPa, gauge.
*7: Polymerization duration 2 expressed by hr.
*8: Polymerization temperature was changed to 70° C.

PRODUCTION EXAMPLE 13
Polymerization of Crystalline Polypropylene Product Y-6

The procedures of Production Example 1 were pursued except that 1.2 mmoles of cyclohexylmethyldimethoxysilane (CMMS) were used instead of the dicyclopentyldimethoxysilane (DCPMS) used in Production Example 1, whereby a crystalline polypropylene product Y-6 was obtained. The material properties thereof are recited in Table 12.

PRODUCTION EXAMPLE 14
Preparation of Crystalline Polypropylene Product Y-4

5 parts by weight of crystalline polypropylene product Y-11 obtained in Production Example 8 and 95 parts by weight of crystalline polypropylene product Y-13 obtained in Production Example 10 were dry-blended to prepare a crystalline polypropylene product Y-4. The material properties thereof are recited in Table 12.

TABLE 12

| | Crystalline Polypropylene Product | | | | | | |
|---|---|---|---|---|---|---|---|
| | Y-1 | Y-2 | Y-3 | Y-4 | Y-6 | Y-7 | Y-8 |
| MFR *1 | 60 | 58 | 56 | 60 | 60 | 31 | 30 |
| I.V. of h-Mw component *4 | 9.8 | 9.8 | — | — | 9.7 | 6.0 | 8.8 |
| Content of h-Mw comp. *5 | 5 | 15 | 0 | — | 6 | 34 | 15 |
| mmmm (%) *2 | 98.6 | 98.5 | 98.7 | 98.4 | 96.4 | 98.6 | 98.5 |
| Mw/Mn *3 | 11.0 | 25.5 | 6.0 | 37.1 | 11.3 | 25.1 | 25.3 |
| Mz/Mw *3 | 10.2 | 9.3 | 3.6 | 5.7 | 10.5 | 7.2 | 9.2 |

TABLE 13

| | Crystalline Polypropylene Product | | | | | | |
|---|---|---|---|---|---|---|---|
| | Y-9 | Y-10 | Y-11 | Y-12 | Y-13 | Y-14 | Y-15 |
| MFR *1 | 35 | 80 | <0.1 | <0.1 | 200 | 300 | 30 |
| I.V. of h-Mw component *4 | 5.8 | 9.8 | 9.8 | 6.5 | — | — | — |
| Content of h-Mw comp. *5 | 25 | 5 | 100 | 100 | 0 | 0 | 0 |
| mmmm (%) *2 | 98.6 | 98.5 | 98.1 | 98.3 | 98.6 | 98.9 | 98.5 |
| Mw/Mn *3 | 23.4 | 11.5 | 7.8 | 7.6 | 6.1 | 6.0 | 6.5 |
| Mz/Mw *3 | 7.0 | 10.3 | 3.9 | 3.8 | 3.3 | 3.6 | 3.7 |

Notes
*1 to *3 See Table 2.
*4 Intrinsic viscosity of the higher molecular weight component in dl/g, determined in decalin at 135° C..
*5 Content of the higher molecular weight component in weight %

PRODUCTION EXAMPLE 15
Polymerization of Crystalline Propylene Block-copolymer [1]

(1) Titanium-based Solid Catalyst Component

In this Production Example, the titanium-based solid catalyst component prepared in the "preparation of titanium-based solid catalyst component [1]" described previously was used as such.

(2) Prepolymerization

A reactor having an inner volume of 6 liters equipped with a stirrer was charged with 3 liters of n-heptane and thereto were supplied the above-mentioned titanium-based solid catalyst component in an amount of 30 g, triethylaluminum in an amount of 10-fold moles with respect to titanium atom in the titanium-based solid catalyst component and 2,6-dimethyl-3,3-bis(methoxymethyl)heptane in an amount of 2-fold moles with respect to titanium atom in the titanium-based solid catalyst component. Then, the reactor was charged with 48 N liters of propylene to cause complete polymerization of propylene while maintaining the reactor internal at a temperature not higher than 15° C. to obtain prepolymer solids. This was diluted by adding isobutane thereto so as to reach a concentration of the pre-polymerized solids of 1.6 g/l to obtain a slurry of the pre-polymerized solids.

(3) Polymerization of Crystalline Propylene Block-copolymer Product BY-1

To a reactor having an inner volume of 200 liters equipped with a stirrer, there were supplied 77 kg/hr of liquefied propylene monomer, 13 g/hr of the prepolymer slurry obtained above, 0.1 mole % of triethylaluminum, 0.1 mole % of dicyclopentyldimethoxysilane and such an amount of hydrogen gas that the hydrogen concentration in the liquid phase of the reaction system will reach 17 volume %. In this first step polymerization, the polymerization temperature was 70° C. and the average residence time was 0.4 hour.

From the outlet of the first step reactor, 70 kg/hr of liquefied propylene monomer and 7.0 kg/hr of polypropylene were discharged. They were then supplied as such to a second step reactor of 200 liter volume. In the second reactor, the hydrogen concentration, the polymerization temperature and the average residence time were 14 volume %, 70° C. and 0.2 hour, respectively.

The liquefied propylene monomer and the polypropylene discharged from the outlet of the second step reactor were supplied to a third step reactor of 200 liter volume. In the third step reactor, the hydrogen concentration, the polymerization temperature and the average residence time were 9 volume %, 70° C. and 0.6 hour, respectively.

From the outlet of the third step reactor, 54 kg/hr of gaseous propylene monomer and 23 kg/hr of polypropylene were discharged. The discharged mixture was subjected to a gas/solid separation to separate it into propylene monomer and polypropylene. The resulting polypropylene was supplied to a fourth step gas phase reactor having an inner volume of 220 liters equipped with a stirrer. To the fourth step reactor, 1.4 N m³/hr of ethylene, 3.1 N m³/hr of propylene and 1.0 N m³/hr of nitrogen gas were supplied. In the fourth step ractor, the copolymerization temperature, the average residence time and the pressure were 50° C., 3 hours and 0.16 MPa (1.6 kgf/cm² gauge), respectively.

From the outlet of the fourth step reactor, the polymer mixture and gaseous components were discharged. They were supplied as such to a fifth step reactor of 220 liter volume. To the fifth step reactor also, there were supplied ethylene, propylene and nitrogen gas in the same manner as in the fourth step reactor, wherein the copolymerization temperature, the average residence time and the pressure were the same as in the fourth step reactor. From the outlet of the fifth step reactor, 25 kg/hr of the crystalline polypropylene block-copolyer BY-1 were obtained. The material properties thereof are recited in Table 14.

PRODUCTION EXAMPLES 16–22

Polymerization of Crystalline Propylene Block-copolymer Products BY-2 to BY-8

In the same manner as in Production Example 15, the hydrogen concentrations and the average residence times in the reactors of the first, second and third steps as well as the supply rates of ethylene and propylene to the reactors of the fourth and fifth steps and the copolymerization temperatures therein were adjusted, whereby crystalline propylene block-copolymer products BY-2 to BY-8 as given in Tables 14 and 15 were obtained.

TABLE 14

| | Cryst. Propyl. Block-copolymer | | | |
|---|---|---|---|---|
| | BY-1 | BY-2 | BY-3 | BY-4 |
| MFR of copolymer[1] | 58 | 150 | 90 | 60 |
| MFR of homo-part[2] | 180 | 350 | 260 | 350 |
| 23° C. PX-soluble comp.[3] | 11.5 | 11.4 | 11.0 | 10.4 |
| Ethylene content in 23° C. PX-soluble comp.[4] | 37 | 38 | 37 | 37 |
| I.V. of 23° C. PX-soluble component[5] | 7.5 | 3.0 | 6.5 | 9.5 |

TABLE 15

| | Cryst. Propyl. Block-copolymer | | | |
|---|---|---|---|---|
| | BY-5 | BY-6 | BY-7 | BY-8 |
| MFR of copolymer[1] | 40 | 40 | 60 | 25 |
| MFR of homo-part[2] | 180 | 120 | 200 | 350 |

TABLE 15-continued

| | Cryst. Propyl. Block-copolymer | | | |
|---|---|---|---|---|
| | BY-5 | BY-6 | BY-7 | BY-8 |
| 23° C. PX-soluble comp.[3] | 20.2 | 12.5 | 6.5 | 35.5 |
| Ethylene content in 23° C. PX-soluble comp.[4] | 41 | 52 | 28 | 40 |
| I.V. of 23° C. PX-soluble component[5] | 2.6 | 4.4 | 5.6 | 2.3 |

Notes
[1]MFR of the entire block-copolymer, expressed in g/10 min., determined at 23° C. under a load of 2160 g.
[2]MFR for the homo-polypropylene part of the block-copolymer, expressed in g/10 min., determined at 23° C. under a load of 2160 g.
[3]Content of the 230° C. paraxylene-soluble component, expressed in % by weight.
[4]Content of ethylene in the 23° C. paraxylene-soluble component, expressed in mole %.
[5]Intrinsic viscosity of the 23° C. paraxylene-soluble component expressed in dl/g, determined in decalin at 135° C.

EXAMPLES 11–46 AND COMPARATIVE EXAMPLES 8–16

In the recipes given in Tables 16 to 25, the components (A) to (D), antioxidant, light stabilizer and pigment were blended on a tumbling mixer and the resulting blend was melt-kneaded on a biaxial kneader extruder to prepare each resin composition based on crystalline polypropylene. As the antioxidant, 0.1 part by weight of 2,6-di-tert-butyl-4-methylphenol and 0.3 part by weight of tetrakis{methylene-3-(3',5'-di-tert-butyl-4'-hydroxyphenyl)propionato}methane were used per 100 parts by weight of the crystalline polypropylene component (B). As the light stabilizer, 0.3 part by weight of bis(2,2,6,6-tetramethyl-4-piperidyl)sebacate was used per 100 parts by weight of the crystalline polypropylene component (B). As the pigment, 0.35 part by weight of carbon black was used per 100 parts by weight of the crystalline polypropylene component (B). For the resin compositions containing a filler, magnesium stearate was used as a lubricant in an amount of 0.4 part by weight per 100 parts by weight of the crystalline polypropylene component (B).

A pelletized product of the above resin composition based on crystalline polypropylene was injection-molded using an injection molding machine J100 SA Model II (supplied from the firm Japan Steel Works, Ltd.) at a cylinder set temperature of 230° C. and a metal mold temperature of 60° C. into a test specimen. Using this test specimen, various tests for material properties were carried out. The results are recited in Tables 16–25.

EXAMPLE 47

77 parts by weight of the resin composition based on crystalline polypropylene obtained in Example 11, 20 parts by weight of the filler Z-5 and 3 parts by weight of a modified polypropylene obtained by graft-modifying with maleic anhydride (which has a graft-modified amount of maleic anhydride of 2% by weight and which is abbreviated hereinafter sometimes as MPP) were blended on a tumbleing mixer and the resulting mixture was melt-kneaded on a biaxial kneader extruder to prepare a resin composition based on crystalline polypropylene containing modified polypropylene. The same procedures as in Example 11 were pursued except that the modified polypropylene-containing resin compoistion based on crystalline polypropylene prepared as above was used in the place of the crystalline polypropylene-based resin composition of Example 11. The results are recited in Table 23.

TABLE 16

|  |  |  | Example | | | | |
|---|---|---|---|---|---|---|---|
|  |  |  | 11 | 12 | 13 | 14 | 15 |
| (A) Elastomeric component | Product | | X-7 | X-7 | X-7 | X-9 | X-7 |
| | Part by wt. blended | | 10 | 20 | 60 | 10 | 10 |
| (B) Crystalline PP component | Product | | Y-7 | Y-7 | Y-7 | Y-7 | Y-8 |
| | Part by wt. blended | | 90 | 80 | 40 | 90 | 90 |
| (C) Filler component | Product | | — | — | — | — | — |
| | Part by wt. blended | | — | — | — | — | — |
| (D) Crystal. propylene block-copolymer | Product | | — | — | — | — | — |
| | Part by wt. blended | | — | — | — | — | — |
| 23° C. paraxylene-soluble component | Wt. % in total composition | | 10.1 | 20.1 | 60.2 | 10.2 | 10.2 |
| | Styrene content (wt. %) | | 0 | 0 | 0 | 0 | 0 |
| | Intrinsic viscosity (dl/g) | | 2.8 | 2.8 | 2.7 | 1.7 | 2.7 |
| 135° C. paraxylene-soluble component [9] | Wt. % in total composition | | 89.9 | 79.9 | 39.8 | 89.8 | 89.8 |
| | mmmm (%) [1] | | 98.7 | 98.6 | 98.7 | 98.6 | 98.5 |
| | Mw/Mn [2] | | 24.8 | 25.0 | 25.2 | 25.1 | 25.4 |
| | Mz/Mw [2] | | 7.1 | 7.2 | 7.1 | 7.0 | 9.1 |
| | CFC-Mw ($\times 10^5$, 121° C.) [10] | | 10.4 | 10.4 | 10.3 | 10.4 | 11.5 |
| | $C_2$-mM (wt. %) [11] | | 0 | 0 | 0 | 0 | 0 |
| 135° C. paraxylene-insoluble component | | | | | | | |
| Wt. % in total composition | | | 0 | 0 | 0 | 0 | 0 |
| Material property | MFR (g/10 min.) [3] | | 24 | 20 | 5 | 25 | 23 |
| | FM (MPa) [4] | | 2230 | 1640 | 730 | 2320 | 2470 |
| | IZ (J/m) [5] | | 33 | 96 | 680 | 30 | 21 |
| | HR (Rockwell R) [6] | | 100 | 75 | 23 | 101 | 101 |
| | BT (° C.) [7] | | 10.2 | 4.8 | −48 | 13.5 | 15.1 |
| | Flow mark occurence rate (%) [8] | | <10 | <10 | 28 | <10 | <10 |

TABLE 17

|  |  |  | Example | | | | |
|---|---|---|---|---|---|---|---|
|  |  |  | 16 | 17 | 18 | 19 | 20 |
| (A) Elastomeric component | Product | | X-7 | X-7 | X-7 | X-7 | X-7 |
| | Part by wt. blended | | 20 | 10 | 10 | 4 | 10 |
| (B) Crystalline PP component | Product | | Y-8 | Y-7 | Y-7 | Y-7 | Y-8 |
| | Part by wt. blended | | 80 | 45 | 45 | 48 | 45 |
| (C) Filler component | Product | | — | — | — | — | — |
| | Part by wt. blended | | — | — | — | — | — |
| (D) Crystal. propylene block-copolymer | Product | | — | BY-1 | BY-2 | BY-5 | BY-2 |
| | Part by wt. blended | | — | 45 | 45 | 48 | 45 |
| 23° C. paraxylene-soluble component | Wt. % in total composition | | 20.3 | 15.3 | 15.3 | 13.8 | 15.2 |
| | Styrene content (wt. %) | | 0 | 0 | 0 | 0 | 0 |
| | Intrinsic viscosity (dl/g) | | 2.7 | 4.4 | 2.9 | 2.7 | 2.9 |
| 135° C. paraxylene-soluble component [9] | Wt. % in total composition | | 79.7 | 84.7 | 84.7 | 86.2 | 84.8 |
| | mmmm (%) [1] | | 98.5 | 98.2 | 98.3 | 98.2 | 98.3 |
| | Mw/Mn [2] | | 25.2 | 13.5 | 14.2 | 11.2 | 21.4 |
| | Mz/Mw [2] | | 9.3 | 7.7 | 7.9 | 7.9 | 8.0 |
| | CFC-Mw ($\times 10^5$, 121° C.) [10] | | 11.4 | 6.1 | 6.1 | 6.3 | 6.5 |
| | $C_2$-mM (wt. &) [11] | | 0 | 26 | 0 | 0 | 0 |
| 135° C. paraxylene-insoluble component | | | | | | | |
| Wt. % in total composition | | | 0 | 0 | 0 | 0 | 0 |
| Material property | MFR (g/10 min.) [3] | | 19 | 33 | 58 | 31 | 55 |
| | FM (MPa) [4] | | 1890 | 1940 | 1930 | 1990 | 2140 |
| | IZ (J/m) [5] | | 48 | 56 | 50 | 53 | 35 |
| | HR (Rockwell R) [6] | | 82 | 89 | 90 | 89 | 90 |
| | BT (° C.) [7] | | 5.3 | 5.1 | 7.8 | 5.1 | 9.2 |
| | Flow mark occurence rate (%) [8] | | <10 | 12 | <10 | <10 | <10 |

TABLE 18

|  |  |  | Example | | | | |
|---|---|---|---|---|---|---|---|
|  |  |  | 21 | 22 | 23 | 24 | 25 |
| (A) Elastomeric component | Product | | X-3 | X-9 | X-10 | X3/X10 | X8/X9 |
| | Part by wt. blended | | 22 | 22 | 22 | 11/11 | 16/16 |
| (B) Crystalline PP component | Product | | Y-7 | Y-7 | Y-7 | Y-7 | Y-7 |
| | Part by wt. blended | | 20 | 20 | 20 | 20 | 20 |

TABLE 18-continued

|  |  |  | Example | | | | |
| --- | --- | --- | --- | --- | --- | --- | --- |
|  |  |  | 21 | 22 | 23 | 24 | 25 |
| (C) Filler component | | Product | Z-1 | Z-1 | Z-1 | Z-1 | Z-1 |
| | | Part by wt. blended | 20 | 20 | 20 | 20 | 10 |
| (D) Crystal. propylene block-copolymer | | Product | BY-2 | BY-2 | BY-2 | BY-2 | BY-2 |
| | | Part by wt. blended | 38 | 38 | 38 | 38 | 38 |
| 23° C. paraxylene-soluble component | | Wt. % in total composition | 26.5 | 26.4 | 26.3 | 26.4 | 36.4 |
| | | Styrene content (wt. %) | 10.8 | 0 | 0 | 5.4 | 0 |
| | | Intrinsic viscosity (dl/g) | 1.4 | 2.0 | 1.9 | 1.7 | 2.0 |
| 135° C. paraxylene-soluble component [9] | | Wt. % in total composition | 53.6 | 53.5 | 53.7 | 53.4 | 53.5 |
| | | mmmm (%) [1] | 98.3 | 98.2 | 98.3 | 98.4 | 98.1 |
| | | $M_w/M_n$ [2] | 12.6 | 12.8 | 12.5 | 12.9 | 12.1 |
| | | $M_z/M_w$ [2] | 7.8 | 7.9 | 7.6 | 7.5 | 7.0 |
| | | CFC-Mw ($\times 10^5$, 121° C.) [10] | 5.1 | 5.1 | 5.1 | 5.1 | 5.1 |
| | | $C_2$-mM (wt. %) [11] | 0 | 0 | 0 | 0 | 0 |
| 135° C. paraxylene-insoluble component | | | | | | | |
| Wt. % in total composition | | | 19.9 | 20.1 | 20.0 | 20.2 | 10.1 |
| Material property | MFR (g/10 min.) [3] | | 48 | 44 | 45 | 46 | 22 |
| | FM (MPa) [4] | | 2450 | 2480 | 2490 | 2500 | 1550 |
| | IZ (J/m) [5] | | 430 | 380 | 425 | 435 | 560 |
| | HR (Rockwell R) [6] | | 78 | 78 | 79 | 80 | 60 |
| | BT (° C.) [7] | | −32.5 | −21.5 | −23.5 | −28.5 | −39.5 |
| | Flow mark occurence rate (%) [8] | | 27 | 27 | 26 | 27 | 30 |

TABLE 19

|  |  |  | Example | | | | |
| --- | --- | --- | --- | --- | --- | --- | --- |
|  |  |  | 26 | 27 | 28 | 29 | 30 |
| (A) Elastomeric component | | Product | X-10 | X3/X6 | X1/X2 | X-10 | X3/X6 |
| | | Part by wt. blended | 4 | 18/2 | 24/4 | 15 | 22/2 |
| (B) Crystalline PP component | | Product | Y-7 | Y-7 | Y-7 | Y-7 | Y-7 |
| | | Part by wt. blended | 25 | 10 | 10 | 20 | 46 |
| (C) Filler component | | Product | Z-1 | Z-1 | Z-1 | Z-1 | Z-1 |
| | | Part by wt. blended | 10 | 20 | 16 | 20 | 20 |
| (D) Crystal. propylene block-copolymer | | Product | BY-5 | BY-3 | BY-3 | BY-6 | BY-4 |
| | | Part by wt. blended | 61 | 50 | 46 | 45 | 10 |
| 23° C. paraxylene-soluble component | | Wt. % in total composition | 18.8 | 25.6 | 33.1 | 20.5 | 25.0 |
| | | Styrene content (wt. %) | 0 | 14.2 | 0 | 0 | 16.6 |
| | | Intrinsic viscosity (dl/g) | 2.3 | 2.3 | 2.8 | 2.5 | 1.5 |
| 135° C. paraxylene-soluble component [9] | | Wt. % in total composition | 71.0 | 54.4 | 50.7 | 59.3 | 54.9 |
| | | mmmm (%) [1] | 98.3 | 98.3 | 98.1 | 98.3 | 98.4 |
| | | $M_w/M_n$ [2] | 10.1 | 11.3 | 12.1 | 10.8 | 22.5 |
| | | $M_z/M_w$ [2] | 7.2 | 7.6 | 7.5 | 7.1 | 7.0 |
| | | CFC-Mw ($\times 10^5$, 121° C.) [10] | 4.9 | 4.1 | 4.2 | 4.9 | 8.7 |
| | | $C_2$-mM (wt. %) [11] | 0 | 28 | 27 | 5 | 3 |
| 135° C. paraxylene-insoluble component | | | | | | | |
| Wt. % in total composition | | | 10.2 | 20.0 | 16.2 | 20.2 | 20.1 |
| Material property | MFR (g/10 min.) [3] | | 30 | 39 | 19 | 28 | 25 |
| | FM (MPa) [4] | | 2380 | 2510 | 1650 | 2580 | 2520 |
| | IZ (J/m) [5] | | 85 | 425 | 670 | 320 | 380 |
| | HR (Rockwell R) [6] | | 93 | 80 | 46 | 81 | 82 |
| | BT (° C.) [7] | | 8.5 | −33.0 | −38.6 | −5.2 | −30.8 |
| | Flow mark occurence rate (%) [8] | | 21 | 24 | 24 | 26 | 18 |

TABLE 20

|  |  |  | Example | | | | |
| --- | --- | --- | --- | --- | --- | --- | --- |
|  |  |  | 31 | 32 | 33 | 34 | 35 |
| (A) Elastomeric component | | Product | X-3 | X-10 | X3/X6 | X1/X2 | X-9 |
| | | Part by wt. blended | 20 | 15 | 17/2 | 24/4 | 22 |
| (B) Crystalline PP component | | Product | Y-8 | Y-8 | Y-8 | Y-8 | Y-9 |
| | | Part by wt. blended | 10 | 10 | 5 | 3 | 20 |
| (C) Filler component | | Product | Z-1 | Z-1 | Z-1 | Z-1 | Z-1 |
| | | Part by wt. blended | 20 | 20 | 20 | 16 | 20 |

TABLE 20-continued

|  |  |  | Example | | | | |
|---|---|---|---|---|---|---|---|
|  |  |  | 31 | 32 | 33 | 34 | 35 |
| (D) Crystal. propylene block-copolymer | | Product | BY-2 | BY-6 | BY-3 | BY-3 | BY-2 |
| | | Part by wt. blended | 50 | 55 | 56 | 53 | 38 |
| 23° C. paraxy-lene-soluble component | | Wt. % in total composition | 25.8 | 22.0 | 25.3 | 33.9 | 26.5 |
| | | Styrene content (wt. %) | 10.1 | 0 | 13.9 | 0 | 0 |
| | | Intrinsic viscosity (dl/g) | 1.5 | 2.5 | 2.4 | 2.9 | 2.1 |
| 135° C. paraxy-lene-soluble component [9] | | Wt. % in total composition | 54.0 | 58.1 | 54.6 | 50.2 | 53.4 |
| | | mmmm (%) [1] | 98.5 | 98.4 | 98.3 | 98.2 | 98.2 |
| | | $M_w/M_n$ [2] | 14.6 | 13.8 | 8.1 | 7.2 | 13.6 |
| | | $M_z/M_w$ [2] | 8.5 | 8.1 | 8.2 | 7.9 | 7.7 |
| | | CFC-$M_w$ (× $10^5$, 121° C.) [10] | 4.2 | 4.1 | 3.7 | 3.6 | 5.0 |
| | | $C_2$-mM (wt. %) [11] | 10 | 10 | 14 | 30 | 0 |
| 135° C. paraxylene-insoluble component | | | | | | | |
| Wt. % in total composition | | | 20.2 | 19.9 | 20.1 | 15.9 | 20.1 |
| Material property | MFR (g/10 min.) [3] | | 43 | 25 | 41 | 37 | 45 |
| | FM (MPa) [4] | | 2480 | 2600 | 2460 | 1660 | 2470 |
| | IZ (J/m) [5] | | 390 | 300 | 400 | 630 | 430 |
| | HR (Rockwell R) [6] | | 79 | 83 | 80 | 48 | 80 |
| | BT (° C.) [7] | | −31.1 | −3.8 | −30.3 | −37.9 | −22.8 |
| | Flow mark occurence rate (%) [8] | | 22 | 23 | 24 | 24 | 26 |

TABLE 21

|  |  |  | Example | | | | |
|---|---|---|---|---|---|---|---|
|  |  |  | 36 | 37 | 38 | 39 | 40 |
| (A) Elastomeric component | | Product | X-10 | X3/X6 | X1/X2 | X3/X6 | X1/X2 |
| | | Part by wt. blended | 22 | 18/2 | 24/4 | 20/2 | 24/4 |
| (B) Crystalline PP component | | Product | Y-9 | Y-9 | Y-9 | Y-10 | Y-10 |
| | | Part by wt. blended | 20 | 10 | 10 | 10 | 10 |
| (C) Filler component | | Product | Z-1 | Z-1 | Z-1 | Z-1 | Z-1 |
| | | Part by wt. blended | 20 | 20 | 16 | 20 | 16 |
| (D) Crystal. propylene block-copolymer | | Product | BY-2 | BY-3 | BY-3 | BY-3 | BY-3 |
| | | Part by wt. blended | 38 | 50 | 46 | 48 | 46 |
| 23° C. paraxy-lene-soluble component | | Wt. % in total composition | 26.6 | 25.7 | 33.2 | 27.3 | 33.0 |
| | | Styrene content (wt. %) | 0 | 14.2 | 0 | 14.3 | 0 |
| | | Intrinsic viscosity (dl/g) | 2.0 | 2.3 | 2.8 | 2.2 | 2.8 |
| 135° C. paraxy-lene-soluble component [9] | | Wt. % in total composition | 53.2 | 54.5 | 50.6 | 52.7 | 50.9 |
| | | mmmm (%) [1] | 98.2 | 98.3 | 98.5 | 98.1 | 98.5 |
| | | $M_w/M_n$ [2] | 13.0 | 12.3 | 12.8 | 10.0 | 9.8 |
| | | $M_z/M_w$ [2] | 7.6 | 7.5 | 7.8 | 9.8 | 9.7 |
| | | CFC-$M_w$ (× $10^5$, 121° C.) [10] | 5.0 | 4.0 | 4.1 | 3.6 | 3.6 |
| | | $C_2$-mM (wt. %) [11] | 0 | 27 | 26 | 32 | 30 |
| 135° C. paraxylene-insoluble component | | | | | | | |
| Wt. % in total composition | | | 20.2 | 19.8 | 16.2 | 20.0 | 16.1 |
| Material property | MFR (g/10 min.) [3] | | 45 | 40 | 20 | 41 | 21 |
| | FM (MPa) [4] | | 2490 | 2510 | 1640 | 2430 | 1660 |
| | IZ (J/m) [5] | | 430 | 420 | 650 | 450 | 660 |
| | HR (Rockwell R) [6] | | 80 | 81 | 47 | 79 | 47 |
| | BT (° C.) [7] | | −22.8 | −32.5 | −29.5 | −31.4 | −40.1 |
| | Flow mark occurence rate (%) [8] | | 26 | 24 | 24 | 27 | 25 |

TABLE 22

|  |  |  | Example | | | | |
|---|---|---|---|---|---|---|---|
|  |  |  | 41 | 42 | 43 | 44 | 45 |
| (A) Elastomeric component | | Product | X3/X6 | X-10 | X-9 | X3/X4 | X-9 |
| | | Part by wt. blended | 20/2 | 5 | 15 | 12/12 | 22 |
| (B) Crystalline PP component | | Product | Y-7 | Y-7 | Y-8 | Y-1 | Y-7 |
| | | Part by wt. blended | 10 | 20 | 20 | 56 | 20 |
| (C) Filler component | | Product | Z-1 | Z-1 | Z-1 | Z-2 | Z-3 |
| | | Part by wt. blended | 20 | 20 | 10 | 20 | 20 |
| (D) Crystal. propylene block-copolymer | | Product | BY-7 | BY-8 | BY-8 | — | BY-2 |
| | | Part by wt. blended | 48 | 55 | 55 | — | 38 |

TABLE 22-continued

|  |  | Example | | | | |
|---|---|---|---|---|---|---|
|  |  | 41 | 42 | 43 | 44 | 45 |
| 23° C. paraxylene-soluble component | Wt. % in total composition | 25.3 | 24.6 | 34.6 | 24 | 26.0 |
|  | Styrene content (wt. %) | 15.4 | 0 | 0 | 22 | 0 |
|  | Intrinsic viscosity (dl/g) | 1.7 | 2.2 | 2.1 | 1.3 | 2.0 |
| 135° C. paraxylene-soluble component *9 | Wt. % in total composition | 54.8 | 55.2 | 55.3 | 56 | 53.6 |
|  | mmmm (%) *1 | 98.6 | 98.0 | 98.1 | 98.6 | 98.3 |
|  | Mw/Mn *2 | 14.5 | 13.0 | 13.4 | 11.0 | 12.6 |
|  | Mz/Mw *2 | 7.5 | 7.7 | 7.3 | 10.2 | 7.9 |
|  | CFC-Mw (× $10^5$, 121° C.) *10 | 4.1 | 4.9 | 5.2 | 3.9 | 5.1 |
|  | $C_2$-mM (wt. %) *11 | 5 | 3 | 0 | 0 | 0 |
| 135° C. paraxylene-insoluble component |  |  |  |  |  |  |
| Wt. % in total composition |  | 19.9 | 20.2 | 10.1 | 20 | 20.4 |
| Material property | MFR (g/10 min.) *3 | 38 | 18 | 22 | 30 | 43 |
|  | FM (MPa) *4 | 2520 | 2400 | 1550 | 2270 | 2500 |
|  | IZ (J/m) *5 | 320 | 390 | 610 | 321 | 395 |
|  | HR (Rockwell R) *6 | 85 | 77 | 55 | 80 | 79 |
|  | BT (° C.) *7 | −28.5 | −22.1 | −38.6 | −25.3 | −23.9 |
|  | Flow mark occurence rate (%) *8 | 18 | 30 | 29 | 28 | 27 |

TABLE 23

|  |  |  | Example | |
|---|---|---|---|---|
|  |  |  | 46 | 47 |
| (A) Elastomeric component | Product |  | X-9 | X-9 |
|  | Part by wt. blended |  | 22 | 7.7 |
| (B) Crystalline PP component | Product |  | Y-7 | Y-7/MPP |
|  | Part by wt. blended |  | 20 | 69.3/3 |
| (C) Filler component | Product |  | Z-4 | Z-5 |
|  | Part by wt. blended |  | 20 | 20 |
| (D) Crystal. propylene block-copolymer | Product |  | BY-2 | — |
|  | Part by wt. blended |  | 38 | — |
| 23° C. paraxylene-soluble component | Wt. % in total composition |  | 26.3 | 7.7 |
|  | Styrene content (wt. %) |  | 0 | 0 |
|  | Intrinsic viscosity (dl/g) |  | 2.0 | 2.8 |
| 135° C. paraxylene-soluble component *9 | mmmm (%) *1 |  | 53.8 | 72.3 |
|  |  |  | 98.3 | 98.7 |
|  | Mw/Mn *2 |  | 12.8 | 24.7 |
|  | Mz/Mw *2 |  | 7.9 | 7.1 |
|  | CFC-Mw (× $10^5$, 121° C.) *10 |  | 5.0 | 10.4 |
|  | $C_2$-mM (wt. %) *11 |  | 0 | 0 |
| 135° C. paraxylene-insoluble component | Wt. % in total composition |  | 19.9 | 20.0 |
| Material property | MFR | (g/10 min.) *3 | 50 | 12 |
|  | FM | (MPa) *4 | 2150 | 4650 |
|  | IZ | (J/m) *5 | 490 | 150 |
|  | HR | (Rockwell R) *6 | 67 | 110 |
|  | BT | (° C.) *7 | −26.1 | 20 |
|  | Flow mark occurrence rate | (%) *8 | 29 | 21 |

TABLE 24

|  |  | Comparative Example | | | | |
|---|---|---|---|---|---|---|
|  |  | 8 | 9 | 10 | 11 | 12 |
| (A) Elastomeric component | Product | X-10 | X-10 | X-10 | X-10 | X-10 |
|  | Part by wt. blended | 22 | 22 | 20 | 20 | 20 |
| (B) Crystalline PP component | Product | Y-12/Y14 | Y-15 | — | — | — |
|  | Part by wt. blended | 7/13 | 20 | — | — | — |
| (C) Filler component | Product | Z-1 | Z-1 | Z-1 | Z-1 | Z-1 |
|  | Part by wt. blended | 20 | 20 | 20 | 20 | 20 |
| (D) Crystal. propylene block-copolymer | Product | BY-2 | BY-2 | BY-2 | BY-3 | BY-4 |
|  | Part by wt. blended | 38 | 38 | 60 | 60 | 60 |

TABLE 24-continued

|  |  | Comparative Example | | | | |
|---|---|---|---|---|---|---|
|  |  | 8 | 9 | 10 | 11 | 12 |
| 23° C. paraxy-lene-soluble component | Wt. % in total composition | 26.4 | 26.5 | 26.8 | 26.6 | 26.4 |
|  | Styrene content (wt. %) | 0 | 0 | 0 | 0 | 0 |
|  | Intrinsic viscosity (dl/g) | 1.9 | 1.9 | 2.0 | 2.9 | 3.5 |
| 135° C. paraxy-lene-soluble component *9 | Wt. % in total composition | 53.6 | 53.6 | 53.1 | 53.2 | 53.6 |
|  | mmmm (%) *1 | 98.6 | 98.5 | 98.2 | 98.1 | 98.3 |
|  | Mw/Mn *2 | 12.4 | 6.2 | 6.5 | 7.2 | 7.6 |
|  | Mz/Mw *2 | 5.8 | 3.2 | 3.4 | 6.9 | 10.6 |
|  | CFC-Mw (× 10^5, 121° C.) *10 | 6.1 | 3.1 | 2.5 | 2.8 | 2.9 |
|  | $C_2$-mM (wt. %) *11 | 0 | 48 | 54 | 53 | 53 |
| 135° C. paraxylene-insoluble component |  |  |  |  |  |  |
| Wt. % in total composition |  | 20.0 | 19.9 | 20.1 | 20.2 | 20.0 |
| Material property | MFR (g/10 min.) *3 | 60 | 40 | 80 | 42 | 35 |
|  | FM (MPa) *4 | 2450 | 2460 | 2330 | 2380 | 2400 |
|  | IZ (J/m) *5 | 225 | 430 | 430 | 410 | 280 |
|  | HR (Rockwell R) *6 | 80 | 80 | 76 | 78 | 79 |
|  | BT (° C.) *7 | −5.1 | −21.3 | −22.5 | −20.1 | −11.3 |
|  | Flow mark occurence rate (%) *8 | 65 | 89 | 92 | 41 | 24 |

TABLE 25

|  |  | Comparative Example | | | |
|---|---|---|---|---|---|
|  |  | 13 | 14 | 15 | 16 |
| (A) Elastomeric component | Product | X-10 | X-10 | X-10 | — |
|  | Part by wt. blended | 20 | 20 | 20 | — |
| (B) Crystalline PP component | Product | — | — | — | — |
|  | Part by blended | — | — | — | — |
| (C) Filler component | Product | Z-1 | Z-1 | Z-1 | Z-1 |
|  | Part by wt. blended | 20 | 20 | 20 | 20 |
| (D) Crystal. propylene block-copolymer | Product | BY-5 | BY-6 | BY-7 | BY-8 |
|  | Part by wt. blended | 60 | 60 | 60 | 80 |
| 23° C. paraxy-lene-soluble component | Wt. % in total composition | 31 | 27.6 | 26.8 | 28.4 |
|  | Styrene content (wt. %) | 0 | 0 | 0 | 0 |
|  | Intrinsic viscosity (dl/g) | 2.2 | 2.4 | 2.2 | 2.2 |
| 135° C. paraxy-lene-soluble component *9 | Wt. % in total composition | 53.9 | 52.4 | 53.0 | 51.5 |
|  | mmmm (%) *1 | 98.0 | 98.0 | 98.4 | 98.0 |
|  | Mw/Mn *2 | 5.5 | 6.2 | 7.3 | 6.8 |
|  | Mz/Mw *3 | 4.3 | 5.9 | 9.2 | 3.9 |
|  | CFC-Mw (× 10^5, 121° C.) *10 | 3.0 | 3.1 | 2.5 | 2.5 |
|  | $C_2$-mM (wt. %) *11 | 80 | 85 | 10 | 90 |
| 135° C. paraxylene-insoluble component |  |  |  |  |  |
| Wt. % in total composition |  | 20.2 | 20.2 | 20.2 | 20.1 |
| Material property | MFR (g/10 min.) *3 | 25 | 28 | 45 | 23 |
|  | FM (MPa) *4 | 2290 | 2300 | 2510 | 2200 |
|  | IZ (J/m) *5 | 460 | 390 | 190 | 490 |
|  | HR (Rockwell R) *6 | 72 | 77 | 82 | 70 |
|  | BT (° C.) *7 | −23.5 | −19.8 | −17.5 | −29.8 |
|  | Flow mark occurence rate (%) *8 | 89 | 72 | 38 | 98 |

Notes in the Tables 16–25:
*1 See Table 2.
*2 See Table 2.
*3 MFR was determined according to the method prescribed in ASTM D 1238
*4 FM = flexural modulus, which was determined according to the method prescribed in ASTM D 790.
*5 IZ = Izod impact strength, which was determined at 23° C. according to the method prescribed in ASTM D 256.
*6 HR = surface hardness, which was determined using steel ball of R according to the method prescribed in ASTM D 685. Evaluation values are in R scale.
*7 BT = brittle temperature, which was determined according to the method prescribed in ASTM D 746.
*8 See Table 6.
*9 135° C. paraxy-soluble and 23° C. paraxylene-insoluble component.
*10 See Table 6.
*11 See Table 6.

INDUSTRIAL APPLICABILITY

As detailed above, the resin composition based on crystalline polypropylene according to the present invention can be processed into molded articles with better flowability, which exhibit superior mechanical strengths, such as flexural modulus and so on, together with superior appearance due to exclusion of occurrence of flow mark and rashes by existing polymer gels upon the molding, so that it can be employed advantageously in the application field in which polypropylene resins have found their application, such as interior and exterior articles of automobile, casings for household electric instruments, office supplies, furnitures and miscellaneous goods.

What is claimed is:

1. A resin comprising crystalline polypropylene, which composition contains
   (a) 3–65% by weight of a component soluble in paraxylene of 23° C.,
   (b) 35–97% by weight of a component soluble in paraxylene of 135° C. and insoluble in paraxylene of 23° C. and
   (c) 0–30% by weight of a component insoluble in paraxylene of 135° C.,
   wherein
   the component (a) soluble in paraxylene of 23° C. is composed substantially of an elastomeric constituent (a1) having a content of styrene or its derivative in the range of 0–35% by weight and an intrinsic viscosity ($\eta$) determined in decalin at 135° C. in the range of 0.1–5 dl/g,
   the component (b) soluble in paraxylene of 135° C. and insoluble in paraxylene of 23° C. is composed substantially of a crystalline polypropylene constituent (b1) having an isotactic pentad proportion (mmmm) of 97% or higher, a molecular weight distribution expressed by weight-average molecular weight/number-average molecular weight (Mw/Mn), determined by gel permeation chromatography (GPC), of 9 or higher and a molecular weight distribution expressed by z-average molecular weight/weight-average molecular weight (Mz/Mw) of 6 or higher, wherein the crystalline polypropylene (b1) is constituted of at least one selected from the group consisting of, in the first place, a crystalline polypropylene (B-1) which contains a higher molecular weight polypropylene having an intrinsic viscosity ($\eta$) determined in decalin at 135° C. in the range of 4–13 dl/g in a proportion of 1–35% by weight and has a melt flow rate (MFR) for the entire polypropylene constituent determined at 230° C. under a load of 2160 grams in the range of 10–80 g/10 min., a propylene content of 95–100 mole % and an ethylene content of 0–5 mole %, in the second place, another crystalline polypropylene (B-2) and, in the third place, a homopolypropylene part (Db) in a crystalline polypropylene block copolymer (D), and
   the component (c) insoluble in paraxylene of 135° C. is composed substantially of a filler (c1), and wherein
   the melt flow rate (MFR) for the entire crystalline polypropylene resin composition determined at 230° C. under a load of 2160 g is 11–58 g/10 min.

2. The resin composition based on crystalline polypropylene as claimed in claim 1, wherein the elastomeric constitutuent (a1) comprises at least one elastomeric constitutent selected from the group consisting of
   (A-1) an elastomeric constituent, which may or may not be hydrogenated, based on stryene having a stryene content in the range of 10–70% by weight and a conjugated diene content in the range of 30–90% by weight;
   (A-2) an ethylene/α-olefin random copolymer constituent; and
   (A-3) an ethylene/α-olefin/non-conjugated polyene random copolymer constituent;
   with the proviso that when an elastomer based on styrene or its hydrogenation product having a high styrene content is employed as the styrene-based elastomer (A-1) and the styrene content in the constituent (a1) exceeds the value of 35% by weight by the sole use of such styrene-based elastomer, other constituent styrene-based elastomer(s) having lower styrene content, or further ingredient(s) of ethylene/α-olefin random copolymer (A-2) or ethylene/α-olefin/non-conjugated polyene random copolymer (A-3) may be employed in combination with the styrene-based elastomer (A-1) so as to attain a content of styrene structural unit in the constituent (a1) as an average value within the range of 0–35% by weight.

3. The resin composition based on crystalline polypropylene as claimed in claim 1, wherein the elastomeric constituent (a1) comprises at least one elastomer selected from the group consisting of
   (A-1) an elastomeric constituent, which may or may not be hydrogenated, based on styrene having 10–40% by weight of a constituent polymer block based on styrene and 60–90% by weight of a constituent polymer block based on a conjugated diene;
   (A-2) an ethylene/α-olefin random copolymer constituent; and
   (A-3) an ethylene/α-olefin/non-conjugated polyene random copolymer constituent;
   with the proviso that when an elastomer based on stryene or its hydrogenation product having a high styrene content is employed as the styrene-based elastomer (A-1) and the styrene content in the constituent (a1) exceeds the value of 35% by weight by the sole use of such styrene-based elastomer, other constituent styrene-based elastomer(s) having lower styrene content, or further ingredient(s) of ethylene/α-olefin random copolymer (A-2) or ethylene/α-olefin/non-conjugated polyene random copolymer (A-3) may be employed in combination with the styrene-based elastomer (A-1) so as to attain a content of styrene structural unit in the constituent (a1) as an average value within the range of 0–35% by weight.

4. The resin composition based on crystalline polypropylene as claimed in claim 1, wherein the elastomeric constituent (a1) comprises at least one elastomeric constituent selected from the group consisting of
   (A-1) an elastomeric constituent, which may or may not be hydrogenated, based on styrene having 10–70% by weight of a constituent polymer block based on styrene and 30–90% by weight of a constituent polymer block based on a conjugated diene;
   (A-2) an ethylene/α-olefin/non-conjugated polyene random copolymer constituent;
   (A-3) an ethylene/α-olefin/non-conjugated polyene random copolymer; and
   (Da) propylene/ethylene copolymer part in a crystalline block-copolymer component based on propylene (D);
   with the proviso that when an elastomer based on styrene or its hydrogenation product having a high styrene content is employed as the styrene-based elastomer (A-1) and the styrene content in the constituent (a1) exceeds the value of 35% by weight by the sole use of such styrene-based elastomer, other constituent styrene-based elastomer(s) having lower styrene content, or further ingredient(s) of ethylene/α-olefin random copolymer (A-2), ethylene/α-olefin/non-conjugated polyene random copolymer (A-3) or crystalline propylene block-copolymer (D) may be employed in combination with the styrene-based elastomer (A-1) so as to attain a content of styrene structural unit in the constituent (a1) as an average value within the range of 0–35% by weight.

5. The resin composition based on crystalline polypropylene as claimed in claim 1, wherein the crystalline polypropylene constituent (b1) comprises at least one crystalline polypropylene constituent selected from the group consisting of (B-1) a crystalline polypropylene constituent which comprises a high molecular weight polypropylene product having an intrinsic viscosity ($\eta$), determined in decalin at 135° C., of 4–13 dl/g in an amount in the range of 1–35% by weight and which has a melt flow rate (MFR) of the entire polypropylene constituent, determined at 230° C. under a load of 2160 g, in the range of 1–100 g/10 min., a propylene content in the range of 95–100 mole % and an ethylene content in the range of 0–5 mole %;

(B-2) crystalline polypropylene constituents other than that of the above (B-1); and (Db) propylene homopolymer part in the propylene-based crystalline block-copolymer component (D).

6. The resin composition based on crystalline polypropylene as claimed in claim 1, wherein the crystalline polypropylene constituent (b1) is composed substantially of a crystalline polypropylene product which comprises a constituent component having a weight-average molecular weight (Mw) for the 121° C. elution fraction, determined by cross fractionation chromatograph (CFC), of $3.5 \times 10^5$ or higher.

7. The resin composition based on crystalline polypropylene as claimed in claim 1, wherein the crystalline polypropylene constituent (b1) is composed substantially of a crystalline polypropylene product which comprises a constituent component having a weight-average molecular weight (Mw) for the 121° C. elution fraction, determined by cross fractionation chromatograph (CFC), of $3.5 \times 10^5$ or higher and an ethylene content for the highest molecular weight fraction (mM), determined by gel permeation chromatography (GPC), of 45% by weight or lower.

8. The resin composition based on crystalline polypropylene as claimed in claim 1, wherein the crystalline polypropylene constituent (b1) is composed substantially of a crystalline polypropylene product which has a melt flow rate (MFR), determined at 230° C. under a load of 2160 g, in the range of 5–400 g/10 min.

9. The resin composition based on crystalline polypropylene as claimed in claim 1, wherein the crystalline polypropylene constituent (b1) is composed substantially of a crystalline polypropylene product which has a melt flow rate (MFR), determined at 230° C. under a load of 2160 g, in the range of 30–150 g/10 min.

10. A resin composition comprising crystalline polypropylene, which composition contains (a) 20–35% by weight of a component soluble in paraxylene of 23° C., (b) 43–65% by weight of a component soluble in paraxylene of 135° C. and insoluble in paraxylene of 23° C. and (c) 15–22% by weight of a component insoluble in paraxylene of 135° C., wherein the component (a) soluble in paraxylene of 23° C. is composed substantially of an elastomeric constituent (a1) having a content of styrene or its derivative in the range of 0–35% by weight and an intrinsic viscosity ($\eta$) determined in decalin at 135° C. in the range of 0.1–5 dl/g, the component (b) soluble in paraxylene of 135° C. and insoluble in paraxylene of 23° C. is composed substantially of a crystalline polypropylene constituent (b1) having an isotactic pentad proportion (mmmm) of 98% or higher, a molecular weight distribution expressed by weight-average molecular weight/number-average molecular weight (Mw/Mn), determined by gel permeation chromatography (GPC), of 9 or higher and a molecular weight distribution expressed by z-average molecular weight/weight-average molecular weight (Mz/Mw) of 8 or higher, wherein the crystalline polypropylene (b1) is constituted of at least one selected from the group consisting of, in the first place, a crystalline polypropylene (B-1) which contains a higher molecular weight polypropylene having an intrinsic viscosity ($\eta$) determined in decalin at 135° C. in the range of 4–13 dl/g in a proportion of 1–35% by weight and has a melt flow rate (MFR) for the entire polypropylene constituent determined at 230° C. under a load of 2160 grams in the range of 10–80 g/10 min., a propylene content of 95–100 mole % and an ethylene content of 0–5 mole %, in the second place, another crystalline polypropylene (B-2) and, in the third place, a homopolypropylene part (Db) in a crystalline polypropylene block-copolymer (D), and the component (c) insoluble in paraxylene of 135° C. is composed substantially of powdery talc having an average particle size in the range of 1–5 $\mu$m, and wherein the melt flow rate (MFR) for the entire crystalline polypropylene resin composition determined at 230° C. under a load of 2160 g is 11–58 g/10 min.

11. The resin composition based on crystalline polypropylene as claimed in claim 10, wherein the elastomeric constituent (a1) comprises at least one elastomeric constituent selected from the group consisting of (A-1) an elastomeric constituent, which may or may not be hydrogenated, based on stryene having a styrene content in the range of 10–70% by weight and a conjugated diene content in the range of 30–90% by weight;

(A-2) an ethylene/$\alpha$-olefin random copolymer constituent; and (A-3) an ethylene/$\alpha$-olefin/non-conjugated polyene random copolymer constituent;

with the proviso that when an elastomer based on stryene or its hydrogenation product having a high styrene content is employed as the styrene-based elastomer (A-1) and the styrene content in the constituent (a1) exceeds the value of 35% by weight by the sole use of such stryene-based elastomer, other constituent styrene-based elastomer(s) having lower styrene content, or further ingredient(s) of ethylene/$\alpha$-olefin random copolymer (A-2) or ethylene/$\alpha$-olefin/non-conjugated polyene random copolymer (A-3) may be employed in combination with the stryene-based elastomer (A-1) so as to attain a content of styrene structural unit in the constituent (a1) as an average value within the range of 0–35% by weight.

12. The resin composition based on crystalline polypropylene as claimed in claim 10, wherein the elastomeric constituent (a1) comprises at least one elastomeric constituent selected from the group consisting of (A-1) an elastomeric constituent, which may or may not be hydrogenated, based on styrene having 10–40% by weight of a constituent polymer block based on stryene and 60–90% by weight of a constituent polymer block based on a conjugated diene;

(A-2) an ethylene/α-olefin random copolymer constituent; and (A-3) an ethylene/α-olefin/non-conjugated polyene random copolymer constituent;

with the proviso that when an elastomer based on styrene or its hydrogenation product having a high styrene content is employed as the styrene-based elastomer (A-1) and the styrene content in the constituent (a1) exceeds the value of 35% by weight by the sole use of such styrene-based elastomer, other constituent stryene-based elastomer(s) having lower styrene content, or further ingredient(s) of ethylene/α-olefin random copolymer (A-2) or ethylene/α-olefin/non-conjugated polyene random copolymer (A-3) may be employed in combination with the styrene-based elastomer (A-1) so as to attain a content of stryene structural unit in the constituent (a1) as an average value within the range of 0–35% by weight.

13. The resin composition based on crystalline polypropylene as claimed in claim 10, wherein the elastomeric constituent (a1) comprises at least one elastomeric constituent selected from the group consisting of (A-1) an elastomeric constituent, which may or may not be hydrogenated, based on styrene having 10–70% by weight of a constituent polymer block based on stryene and 30–90% by weight of a constituent polymer block based on a conjugated diene;

(A-2) an ethylene/α-olefin random copolymer constituent;

(A-3) an ethylene/α-olefin/non-conjugated polyene random copolymer constituent; and (Da) propylene/ethylene copolymer part in a crystalline block-copolymer component based on propylene (D);

with the proviso that when an elastomer based on styrene or its hydrogenation product having a high styrene content is employed as the styrene-based elastomer (A-1) and the styrene content in the constituent (a1) exceeds the value of 35% by weight by the sole use of such styrene-based elastomer, other constituent stryene-based elastomer(s) having lower styrene content, or further ingredient(s) of ethylene/α-olefin random copolymer (A-2), ethylene/α-olefin/non-conjugated polyene random copolymer (A-3) or crystalline propylene block-copolymer (D) may be employed in combination with the styrene-based elastomer (A-1) so as to attain a content of styrene structural unit in the constituent (a1) as an average value within the range of 0–35% by weight.

14. The resin composition based on crystalline polypropylene as claimed in claim 10, wherein the crystalline polypropylene constituent (b1) comprises at least one crystalline polypropylene constituent selected from the group consisting of (B-1) a crystalline polypropylene constituent which comprises a high molecular weight polypropylene product having an intrinsic viscosity (η), determined in decalin at 135° C., of 4–13 dl/g in an amount in the range of 1–35% by weight and which has a melt flow rate (MFR) of the entire polypropylene constituent, determined at 230° C. under a load of 2160 g, in the range of 1–100 g/10 min., a propylene content in the range of 95–100 mole % and an ethylene content in the range of 0–5 mole %;

(B-2) crystalline polypropylene constituents other than that of the above (B-1); and (Db) propylene homopolymer part in the propylene-based crystalline block-copolymer component (D).

15. The resin composition based on crystalline polypropylene as claimed in claim 10, wherein the crystalline polypropylene constituent (b1) is composed substantially of a crystalline polypropylene product which comprises a constituent component having a weight-average molecular weight (Mw) for the 121° C. elution fraction, determined by cross fractionation chromatograph (CFC), of $3.5 \times 10^5$ or higher.

16. The resin composition based on crystalline polypropylene as claimed in claim 10, wherein the crystalline polypropylene constituent (b1) is composed substantially of a crystalline polypropylene product which comprises a constituent component having a weight-average molecular weight (Mw) for the 121° C. elution fraction, determined by cross fractionation chromatograph (CFC), of $3.5 \times 10^5$ or higher and an ethylene content for the highest molecular weight fraction (mM), determined by gel permeation chromatography (GPC), of 45% by weight or lower.

17. The resin composition based on crystalline polypropylene as claimed in claim 10, wherein the crystalline polypropylene constituent (b1) is composed substantially of a crystalline polypropylene product which has a melt flow rate (MFR), determined at 230° C. under a load of 2160 g, in the range of 5–400 g/10 min.

18. The resin composition based on crystalline polypropylene as claimed in claim 10, wherein the crystalline polypropylene constituent (b1) is composed substantially of a crystalline polypropylene product which has a melt flow rate (MFR), determined at 230° C. under a load of 2160 g, in the range of 30–150 g/10 min.

19. A resin composition comprising crystalline polypropylene, which composition contains (A) at least one elastomeric component selected from the group consisting of (A-1) styrene-based elastomeric constituent, which may or may not be hydrogenated, having a styrene content in the range of 10–70% by weight and a conjugated diene content in the range of 30–90% by weight;

(A-2) an ethylene/α-olefin random copolymer constituent; and (A-3) an ethylene/α-olefin/non-conjugated polyene random copolymer constituent;

(B) at least one crystalline polypropylene constituent selected from the group consisting of (B-1) a crystalline polypropylene constituent which comprises a high molecular weight polypropylene product having an intrinsic viscosity (η), determined in decalin at 135° C., of 4–13 dl/g in an amount in the range of 1–35% by weight and which has a melt flow rate (MFR) of the entire polypropylene constituent, determined at 230° C. under a load of 2160 g, in the range of 10–80 g/10 min., a propylene content in the range of 95–100 mole % and an ethylene content in the range of 0–5 mole % and (B-2) a crystalline polypropylene constituent other than the above (B-1);

(C) a filler component; and (D) a crystalline block-copolymer component based on propylene comprising (Da) a propylene/ethylene copolymer part and (Db) a propylene homopolymer part and containing, with respect to the total weight of the copolymer component, 5–50% by weight of a 23° C. paraxylene-soluble component (a) which has an intrinsic viscosity (η), determined in decalin at 135° C., of 2–10 dl/g and an ethylene content of 15–60 mole %, wherein the propylene/ethylene copolymer part (Da) is substantially the 23° C. paraxylene-soluble component (e) and the propylene homopolymer part (Db) is substantially a component (b) soluble in 135° C. paraxylene and insoluble in 23° C. under a load of 2160 g, of 10–500 g/10 min., and wherein the weight ratio of (A)/(B)/(C)/(D) is in the range of (3–99)/(1–97)/(0–30)/(0–96);

said resin composition having (a) 3–65% by weight of a component soluble in paraxylene of 23° C., (b) 35–97% by weight of a component soluble in paraxylene of 135° C. and insoluble in paraxylene of 23° C. and (c) 0–30% by weight of a component insoluble in paraxylene of 135° C., wherein the component (a) soluble in paraxylene of 23° C. is composed substantially of an elastomeric constituent (a1) having a content of styrene or its derivative in the range of 0–35% by weight and its intrinsic viscosity (η) determined in decalin at 135° C. in the range of 0.1–5 dl/g, the component (b) soluble in paraxylene of 135° C. and insoluble in paraxylene of 23° C. is composed substantially of a crystalline polypropylene constituent (b1) having an isotactic pentad proportion (mmmm) of 97% or higher, a molecular weight distribution expressed by weight-average molecular weight/number-average molecular weight (Mw/Mn), determined by gel permeation chromatography (GPC), of 9 or higher and a molecular weight distribution expressed by z-average molecular weight/weight-average molecular weight (Mz/Mw) or 6 or higher and the component (c) insoluble in paraxylene of 135° C. is composed substantially of a filler (c1), and wherein the melt flow rate (MFR) for the entire crystalline polypropylene resin composition determined at 230° C. under a load of 2160 g is 11–58 g/10 min.

20. The resin composition based on crystalline polypropylene as claimed in claim 19, wherein the weight ratio of (A)/(B)/(C)/(D) is in the range of (3–40)/(1–50)/(0–30)/(10–96).

21. The resin composition based on crystalline polypropylene as claimed in claim 19, wherein the crystalline polypropylene component (B) has an isotactic pentad proportion (mmmm) of 97% or higher.

22. The resin composition comprising crystalline polypropylene as claimed in claim 19, wherein the crystalline polypropylene component (B) has a molecular weight distribution expressed by weight-average molecular weight/number-average molecular weight (Mw/Mn), determined by a gel permeation chromatography (GPC), of 9 or higher and a molecular weight distribution expressed by z-average molecular weight/weight-average molecular weight (Mz/Mw) of 6 or higher.

23. A resin composition based on crystalline polypropylene which composition contains (A) at least one elastomeric component selected from the group consisting of (A-1) styrene-based elastomeric constituent, which may or may not be hydrogenated, having a styrene content in the range of 10–70% by weight and a conjugated diene content in the range of 30–90% by weight;

(A-2) an ethylene/α-olefin random copolymer constituent; and (A-3) an ethylene/α-olefin/non-conjugated polyene random copolymer constituent;

(B) at least one crystalline polypropylene constituent selected from the group consisting of (B-1) a crystalline polypropylene constituent which comprises a high molecular weight polypropylene product having an intrinsic viscosity (η), determined in decalin at 135° C., of 4–13 dl/g in an amount in the range of 1–35% by weight and which has a melt flow rate (MFR) of the entire polypropylene constituent, determined at 230° C. under a load of 2160 g, in the range of 10–80 g/10 min., a propylene content in the range of 95–100 mole % and an ethylene content in the range of 0–5 mole % and (B-2) a crystalline polypropylene constituent other than the above (B-1);

(C) a filler component composed substantially of a powdery talc having an average particle size in the range of 1–5 μm;

(D) a crystalline block-copolymer component based on propylene comprising (Da) a propylene/ethylene copolymer part and (Db) a propylene homopolymer part and containing, with respect to the total weight of the copolymer component, 5–50% by weight of the 23° C. paraxylene-soluble component (a) which has an intrinsic viscosity (η), determined in decalin at 135° C., of 2–10 dl/g and an ethylene content of 15–60 mole %, wherein the propylene/ethylene copolymer part (Da) is substantially the 23° C. paraxylene-soluble component (e) and the propylene homopolymer part (Db) is substantially a component (b) soluble in 135° C. paraxylene and insoluble in 23° C. paraxylene and having a melt flow rate (MFR), determined at 230° C. under a load of 2160 g, of 10–500 g/10 min., and wherein the weight ratio of (A)/(B)/(C)/(D) is in the range of (3–99)/(1–97)/(0–30)/(0–96);

said resin composition having (a) 20–35% by weight of a component soluble in paraxylene of 23° C., (b) 43–65% by weight of a component soluble in paraxylene of 135° C. and insoluble in paraxylene of 23° C. and (c) 15–22% by weight of a component insoluble in paraxylene of 135° C., wherein the component (a) soluble in paraxylene of 23° C. is composed substantially of an elastomeric constituent (a1) having a content of styrene or its derivative in the range of 0–35% by weight and an intrinsic viscosity (η) determined in decalin at 135° C. in the range of 0.1–5 dl/g, the component (b) soluble in paraxylene at 135° C. and insoluble in paraxylene of 23° C. is composed substantially of a crystalline polypropylene constituent (b1) having an isotactic pentad proportion (mmmm)

of 98% or higher, a molecular weight distribution expressed by weight-average molecular weight/number-average molecular weight (Mw/Mn), determined by gel permeation chromatography (GPC), of 9 or higher and a molecular weight distribution expressed by z-average molecular weight/weight-average molecular weight (Mz/Mw) of 8 or higher and the component (c) insoluble in paraxylene of 135° C. is composed substantially of a filler (c1), and wherein the melt flow rate (MFR) for the entire crystalline polypropylene resin composition determined at 230° C. under a load of 2160 g is 11–58 g/10 min.

24. The resin composition based on crystalline polypropylene as claimed in claim 23, wherein the weight ratio of (A)/(B)/(C)/(D) is in the range of (3–40)/(1–50)/(0–30)/(10–96).

25. The resin composition based on crystalline polypropylene as claimed in claim 23, wherein the crystalline polypropylene component (B) has an isotactic pentad proportion (mmmm) of 97% or higher.

26. The resin comprising crystalline polypropylene as claimed in claim 23, wherein the crystalline polypropylene component (B) has a molecular weight distribution expressed by weight-average molecular weight/number-average molecular weight (Mw/Mn), determined by a gel permeation chromatography (GPC), of 9 or higher and a molecular weight distribution expressed by z-average molecular weight/weight-average molecular weight (Mz/Mw) of 6 or higher.

27. A resin composition comprising crystalline polypropylene, which composition contains (a) 3–65% by weight of a component soluble in paraxylene of 23° C., (b) 35–97% by weight of a component soluble in paraxylene of 135° C. and insoluble in paraxylene of 23° C. and (c) 0–30% by weight of a component insoluble in paraxylene of 135° C., wherein the component (a) soluble in paraxylene of 23° C. is composed substantially of an elastomeric constituent (a1) having a content of styrene or its derivative in the range of 0–35% by weight and an intrinsic viscosity ($\eta$) determined in decalin at 135° C. in the range of 0.1–5 dl/g, the component (b) soluble in paraxylene of 135° C. and insoluble in paraxylene of 23° C. is composed substantially of a crystalline polypropylene constituent (b1) having an isotactic pentad proportion (mmmm) of 97% or higher, a molecular weight distribution expressed by weight-average molecular weight/number-average molecular weight (Mw/Mn), determined by gel permeation chromatography (GPC), of 9 or higher and a molecular weight distribution expressed by z-average molecular weight/weight-average molecular weight (Mz/Mw) of 6 or higher, wherein the crystalline polypropylene (b1) comprises a crystalline polypropylene (B-1) which contains a higher molecular weight polypropylene having an intrinsic viscosity ($\eta$) determined in decalin at 135° C. in the range of 4–13 dl/g in a proportion of 1–35% by weight and has a melt flow rate (MFR) for the entire polypropylene constituent determined at 230° C. under a load of 2160 grams in the range of 10–80 g/10 min., a propylene content of 95–100 mole % and an ethylene content of 0–5 mole % or comprises this crystalline polypropylene (B-1) and a homopolypropylene part (Db) in a crystalline polypropylene block-copolymer (D), and the component (c) insoluble in paraxylene of 135° C. is composed substantially of a filler (c-1), and wherein the melt flow rate (MFR) for the entire crystalline polypropylene resin composition determined at 230° C. under a load of 2160 g is 11–58 g/10 min.

28. A resin composition comprising crystalline polypropylene, which composition contains (a) 20–35% by weight of a component soluble in paraxylene of 23° C., (b) 43–65% by weight of a component soluble in paraxylene of 135° C. and insoluble in paraxylene of 23° C., (c) 15–22% by weight of a component insoluble in paraxylene of 135° C., wherein the component (a) soluble in paraxylene of 23° C. is composed substantially of an elastomeric constituent (a1) having a content of styrene or its derivative in the range of 0–35% by weight and an intrinsic viscosity ($\eta$) determined in decalin at 135° C. in the range of 0.1–5 dl/g, the component (b) soluble in paraxylene of 135° C. and insoluble in paraxylene of 23° C. is composed substantially of a crystalline polypropylene constituent (b1) having an isotactic pentad proportion (mmmm) of 98% or higher, a molecular weight distribution expressed by weight-average molecular weight/number-average molecular weight (Mw/Mn), determined by gel permeation chromatography (GPC), of 9 or higher and a molecular weight distribution expressed by z-average molecular weight/weight-average molecular weight (Mz/Mw) of 8 or higher, wherein the crystalline polypropylene (b1) comprises a crystalline polypropylene (B-1) which contains a higher molecular weight polypropylene having an intrinsic viscosity ($\eta$) determined in decalin at 135° C. in the range of 4–13 dl/g in a proportion of 1–35% by weight and has a melt flow rate (MFR) for the entire polypropylene constituent determined at 230° C. under a load of 2160 grams in the range of 10–80 g/10 min., a propylene content of 95–100 mole % and an ethylene content of 0–5 mole % or comprises this crystalline polypropylene (B-1) and a homopolypropylene part (Db) in a crystalline polypropylene block-copolymer (D), and the component (c) insoluble in paraxylene of 135° C. is composed substantially of powdery talc having an average particle size in the range of 1–5 $\mu$m, and wherein the melt flow rate (MFR) for the entire crystalline polypropylene resin composition determined at 230° C. under a load of 2160 g is 11–58 g/10 min.

* * * * *